United States Patent
Ji et al.

(10) Patent No.: US 7,165,187 B2
(45) Date of Patent: Jan. 16, 2007

(54) BATCH BASED DISTRIBUTED DATA REDUNDANCY

(75) Inventors: Minwen Ji, Sunnyvale, CA (US); Alistair Veitch, Mountain View, CA (US); John Wilkes, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 581 days.

(21) Appl. No.: 10/456,863

(22) Filed: Jun. 6, 2003

(65) Prior Publication Data

US 2004/0268177 A1    Dec. 30, 2004

(51) Int. Cl.
*G06F 11/00* (2006.01)

(52) U.S. Cl. .................... 714/5; 718/101; 711/162

(58) Field of Classification Search ............ 718/101; 714/5, 6, 43; 709/233, 223; 711/162; 719/6
See application file for complete search history.

(56) References Cited

U.S. PATENT DOCUMENTS

| | | | | |
|---|---|---|---|---|
| 4,771,391 A | * | 9/1988 | Blasbalg | 709/232 |
| 5,140,592 A | * | 8/1992 | Idleman et al. | 714/5 |
| 5,544,347 A | | 8/1996 | Yanai et al. | |
| 5,742,792 A | | 4/1998 | Yanai et al. | |
| 5,889,935 A | * | 3/1999 | Ofek et al. | 714/6 |
| 5,909,692 A | | 6/1999 | Yanai et al. | |
| 6,092,066 A | | 7/2000 | Ofek | |
| 6,101,497 A | | 8/2000 | Ofek | |
| 6,108,748 A | | 8/2000 | Ofek et al. | |
| 6,148,383 A | * | 11/2000 | Micka et al. | 711/162 |
| 6,157,991 A | * | 12/2000 | Arnon | 711/161 |
| 6,173,377 B1 | * | 1/2001 | Yanai et al. | 711/162 |
| 6,442,706 B1 | * | 8/2002 | Wahl et al. | 714/6 |
| 6,442,709 B1 | * | 8/2002 | Beal et al. | 714/33 |
| 6,487,561 B1 | * | 11/2002 | Ofek et al. | 707/204 |
| 6,591,351 B1 | * | 7/2003 | Urabe et al. | 711/162 |
| 6,615,332 B1 | * | 9/2003 | Yamamoto et al. | 711/167 |
| 6,662,197 B1 | * | 12/2003 | LeCrone et al. | 707/204 |
| 6,681,339 B1 | * | 1/2004 | McKean et al. | 714/5 |
| 6,694,447 B1 | * | 2/2004 | Leach et al. | 714/6 |

(Continued)

OTHER PUBLICATIONS

Fay Chang, Minwen Ji, Shun-Tak A. Leung, John MacCormick, Sharon E. Perl and Li Zhang, Myriad: Cost-effective Disaster Tolerance, Proceedings of the FAST 2002 Conference on File and Storagae Technologies, Monterey, CA, pp. 103-116, The USENIX Association, Berkeley, CA, Jan. 2002.

(Continued)

*Primary Examiner*—Robert W Beausoliel
*Assistant Examiner*—Christopher McCarthy

(57) ABSTRACT

Techniques for performing data redundancy operations in a distributed manner. A primary data storage facility stores a primary copy of data and a secondary facility stores data that is redundant of the primary copy of the data. The primary facility includes a first redundancy appliance that receives a first sequence of write requests and stores data for the first sequence of write requests in mass storage associated with the first redundancy appliance. A second redundancy appliance receives a second sequence of write requests and stores data for the second sequence of write requests in mass storage associated with the second redundancy appliance. Thus, a workload is shared among the first and second redundancy appliances by dividing the workload into the first and second sequences of write requests, where each sequence is handled by a different redundancy appliance. Because the operations are distributed in such a facility, it is expected that the facility will be able to accommodate a larger workload than otherwise (e.g., having a higher storage request rate or requiring additional storage capacity).

30 Claims, 14 Drawing Sheets

U.S. PATENT DOCUMENTS

| | | | |
|---|---|---|---|
| 6,728,848 | B1* | 4/2004 | Tamura et al. ............... 711/162 |
| 6,769,030 | B1* | 7/2004 | Bournas ..................... 709/233 |
| 6,898,685 | B1* | 5/2005 | Meiri et al. ................. 711/167 |
| 2002/0016827 | A1* | 2/2002 | McCabe et al. ............ 709/213 |
| 2002/0099916 | A1* | 7/2002 | Ohran et al. ................ 711/162 |
| 2003/0014534 | A1* | 1/2003 | Watanabe et al. ........... 709/233 |
| 2003/0074600 | A1* | 4/2003 | Tamatsu ........................ 714/6 |
| 2003/0225760 | A1* | 12/2003 | Ruuth et al. .................... 707/5 |
| 2004/0088507 | A1* | 5/2004 | Satoyama et al. .......... 711/162 |
| 2004/0107226 | A1* | 6/2004 | Autrey et al. ............... 707/204 |

OTHER PUBLICATIONS

Chia Chao, Robert English, David Jacobson, Alexander Stepanov, and John Wilkes, Mime: a high performance parallel storage device with strong recovery guarantees, HP Laboratories Technical Report HPL-CSP-92-9 rev 1, Mar. 18, 1992, revised Nov. 6, 1992, Hewlett-Packard Company, Palo Alto, CA, 1992.

Remote Copy Administrator's Guide and Reference, IBM DFSMS/MVS Version 1, Fourth Edition, pp. i to xv and pp. 1 thru 170, International Business Machines Corporation, Raleigh, NC, Dec. 1997.

Hugo Patterson, Stephen Manley, Mike Federwisch, Dave Hitz, Steve Klieman and Shane Owara, SnapMirror: File System Based Asynchronous Mirroring for Disaster Recovery, Proceedings of the FAST 2002 Conference on File and Storagae Technologies, Monterey, CA, pp. 117-129, The USENIX Association, Berkeley, CA, Jan. 2002.

Symmetrix Remote Data Facility (SRDF) Product Description Guide, EMC Corporation, Hopkinton, MA, USA, 2000.

Michael Stonebraker and Gerhard A. Schloss, Distributed Raid—A New Multiple Copy Algorithm, UCB Electronics Research Laboratory Technical Report ERL-M89-56, Electronics Research Laboratory, University of California, Berkeley, CA, 1989.

EMC TimeFinder Product Description Guide, EMC Corporation, Hopkinton, Massachusetts, USA, 1998.

* cited by examiner

BATCH BASED DISTRIBUTED DATA REDUNDANCY

RELATED APPLICATIONS

The following applications disclose related subject matter: U.S. application Ser. No. 10,456,345, filed (on the same day as this application) and entitled, "Asynchronous Data Redundancy Technique"; U.S. application Ser. No. 10,456,041, filed (on the same day as this application) and entitled, "Redundant Data Consistency After Failover"; U.S. application Ser. No. 10,456,053, filed (on the same day as this application) and entitled, "Fault-Tolerant Data Redundancy Technique"; U.S. application Ser. No. 10,456,029, filed (on the same day as this application) and entitled, "Adaptive Batch Sizing for Asynchronous Data Redundancy"; U.S. application Ser. No. 10,456,367, filed (on the same day as this application) and entitled, "State Machine and System for Data Redundancy"; U.S. application Ser. No. 10,456,363, filed (on the same day as this application) and entitled, "Batched, Asynchronous Data Redundancy Technique"; U.S. application Ser. No. 10,456,352, filed (on the same day as this application) and entitled, "Data Redundancy Using Portal and Host Computer"; the contents of all of which are hereby incorporated by reference.

BACKGROUND OF THE INVENTION

The present invention relates to the field of data storage. More particularly, the present invention relates to techniques for redundant data storage.

Remote mirroring is a data redundancy technique for coping with storage system failures. A copy of data, sometimes referred to as a 'primary' or 'local' copy, is updated, for example, as it is accessed by an application program. A redundant copy of the data, sometimes referred to as a 'secondary' or 'slave' copy of the data, usually at a remote site, is updated as well. When a failure occurs that renders the primary copy unusable or inaccessible, the data can be restored from the secondary copy, or accessed directly from there.

Conventional techniques for remote mirroring tend to maintain the primary and secondary copies of the data synchronized. However, such techniques do not cope well with unexpected circumstances such as lengthy communication delays to the remote site, buffers filled to capacity, failures, and so forth.

Therefore, what is needed is an improved technique for redundant data storage. It is to this end that the present invention is directed.

SUMMARY OF THE INVENTION

The invention provides methods and apparatus for performing data redundancy operations in a distributed manner. In one aspect, a primary data storage facility stores a primary copy of data and a secondary facility stores data that is redundant of the primary copy of the data. The primary facility includes a first redundancy appliance that receives a first sequence of write requests and stores data for the first sequence of write requests in mass storage associated with the first redundancy appliance. A second redundancy appliance receives a second sequence of write requests and stores data for the second sequence of write requests in mass storage associated with the second redundancy appliance. Thus, a workload is shared among the first and second redundancy appliances by dividing the workload into the first and second sequences of write requests, where each sequence is handled by a different redundancy appliance.

The first and second redundancy appliances may each forward redundant data to the secondary facility in send batches having coordinated send batch boundaries. In this way, data consistency may be maintained in the event a fault prevents one of the redundancy appliances from forwarding its data. The send batch boundaries may be coordinated by, for example, terminating a send batch based on time (e.g., by terminating immediately upon notification or at previously identified time); after a previously identified request is received (e.g., after a number of future request have been received); based upon agreement of the first and second redundancy appliances; based upon notification from a host; or after a determined quantity of data is received (e.g. after 4 MB have been received). One of the first and second redundancy appliances may inform the other of how a send batch is to be terminated or a host computer may inform both of the first and second redundancy appliances. Alternately, the host computer may inform one of the first and second redundancy appliances and that redundancy appliance may inform the other.

These and other aspects of the invention are explained in more detail herein.

DETAILED DESCRIPTION OF A PREFERRED EMBODIMENT

The invention provides methods and apparatus for performing data redundancy operations in a distributed manner. A primary data storage facility stores a primary copy of data and a secondary facility stores data that is redundant of the primary copy of the data. The primary facility includes a first redundancy appliance that receives a first sequence of write requests and stores data for the first sequence of write requests in mass storage associated with the first redundancy appliance. A second redundancy appliance receives a second sequence of write requests and stores data for the second sequence of write requests in mass storage associated with the second redundancy appliance. Thus, a workload is shared among the first and second redundancy appliances by dividing the workload into the first and second sequences of write requests, where each sequence is handled by a different redundancy appliance. Because the operations are distributed in such a facility, it is expected that the facility will be able to accommodate a larger workload than otherwise (e.g., having a higher storage request rate or requiring additional storage capacity).

The invention can be applied to any computer system in which a primary copy of data is backed up by data that is redundant of the primary copy. For example, the primary copy may be stored at a primary data storage facility, while redundant data may be stored at one or more secondary storage facilities. The data storage facilities can include any type of data storage, such as volatile or non-volatile memory, including random access memory, flash memory, magnetic tape or disk, an array of disk drives and so forth. The primary and secondary storage facilities are positioned at different locations, which are generally remote from one another. Thus, the storage facilities communicate via a network or via a direct communication link. Exemplary communication networks include: local area networks (LANs), metropolitan area networks (MANs), wide area networks (WANs), storage area networks (SANs), the Internet and so forth.

Figure 1:
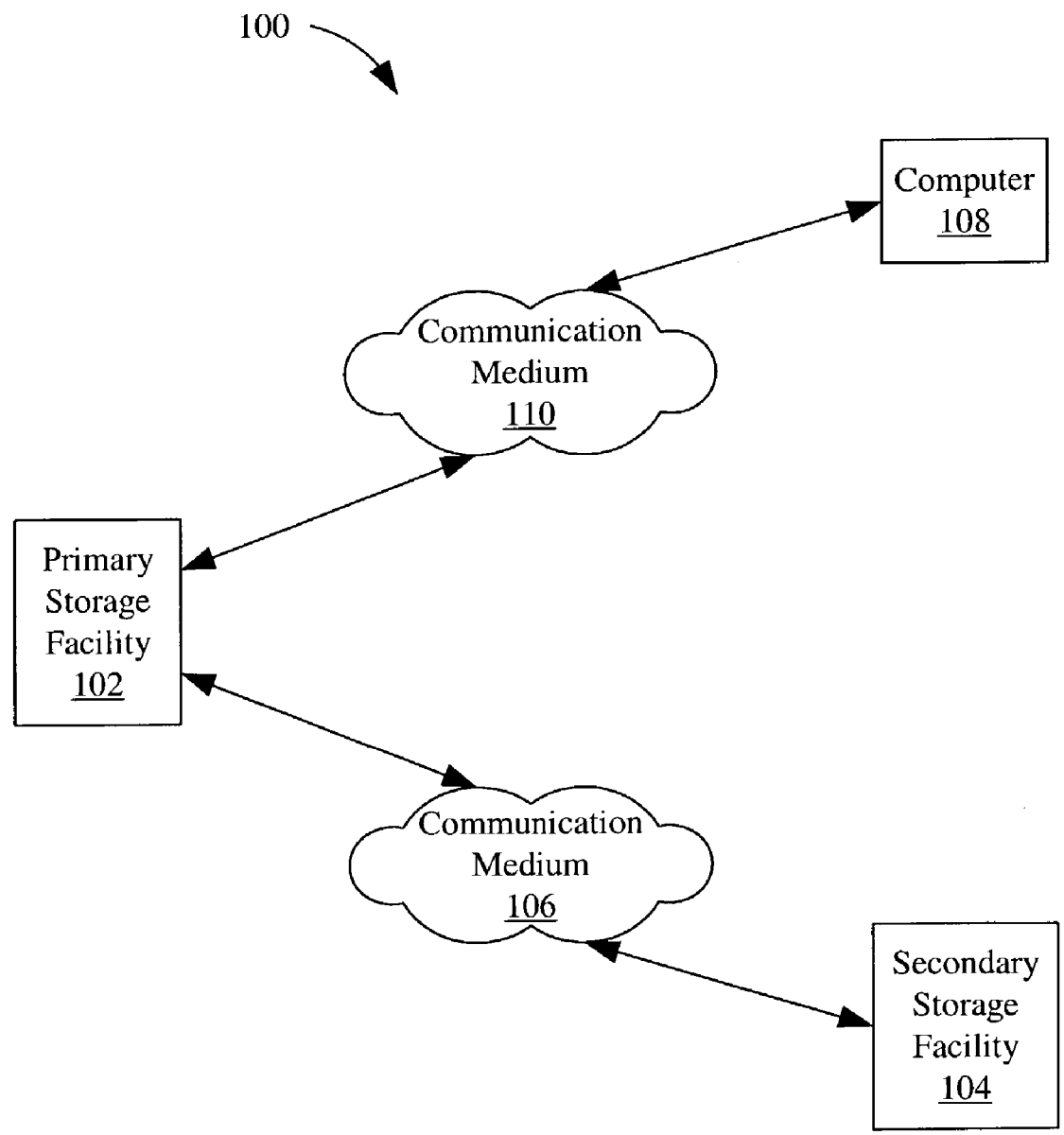
FIG. 1 illustrates a computer system including a primary data storage facility and a secondary data storage facility in which the present invention may be implemented.

FIG. 1 illustrates a computer system 100 by which the present invention may be implemented. The system 100 includes a primary data storage facility 102, a secondary data storage facility 104 and a communication medium 106, such as a network, for interconnecting the primary and secondary storage facilities 102 and 104.

Additional devices, such as one or more computer(s) 108 (e.g., a host computer, a workstation or a server), may communicate with the primary data storage facility 102 (e.g., via communication medium 110). While FIG. 1 illustrates the communication medium 106 and the communication medium 110 as being separate, they may be combined. For example, communication between the computer 108 and the primary facility 102 may be through the same network as is used for the primary storage facility 102 and secondary storage facility 104 to communicate.

One or more applications operating at the computer 108 may access the primary data storage facility 102 for performing write or read transactions to or from data objects, such as files or storage volumes, stored at the facility 102. More particularly, the computer 108 may retrieve a copy of a data object by issuing a read request to the facility 102. Also, when a data object at the computer 108 is ready for storage at the facility 102, the computer 108 may issue a write request to the facility 102. For example, the computer 108 may request storage of a file undergoing modification by the computer 108. While a single computer 108 is illustrated in FIG. 1, it will be apparent that multiple computers may access the data storage facilities 102 and 104. In addition, a computer system 100 may include any number of devices that retrieve, modify and/or generate data and any number of primary and secondary storage facilities. Further, a device, such as a workstation or server, may also function as a storage facility. Still further, a storage facility may function as a primary storage facility for some data and as a secondary storage facility for other data, and a storage facility may function as a computer system, generating storage requests (e.g., as part of a backup process). The connections between the various components shown in FIG. 1 are purely exemplary: any other topology, including direct connections, multiple networks, multiple network fabrics, etcetera, may be used.

For increasing data reliability in the event of a fault at the primary storage facility 102, data that is redundant of data stored at the primary facility 102 is stored at the secondary facility 104. For example, the secondary facility 104 may store a mirrored copy of the data. Alternately, the redundant data may be arranged according to a redundancy scheme in which redundant data is distributed among or striped across multiple storage devices or facilities. For example, the redundant data may be stored at the secondary facility 104 in accordance with Redundant Array of Inexpensive Disks (RAID) techniques, such as RAID levels 2, 3, 4 or 5. Further, one or more additional secondary storage facilities may be provided, in which each stores only a portion of the data stored at the primary 102 (thus, proving a distributed redundant copy) or where each stores a complete copy of the data (thus, providing multiple redundant copies).

In absence of a fault at the primary facility 102, the computer 108 generally does not direct write and read accesses to the secondary storage facility 104. Rather, for performing write and read operations, the computer 108 accesses the primary storage facility 102. The primary facility 102 and the secondary facility 104 then interact to provide redundant data at the secondary facility 104. In the event of a fault at the primary storage facility 102, lost data may then be reconstructed from the redundant data stored at the secondary facility 104 and delivered to the computer 108, or another computer (not shown) may be used to access data at the secondary facility 104 after failover.

Figure 2:
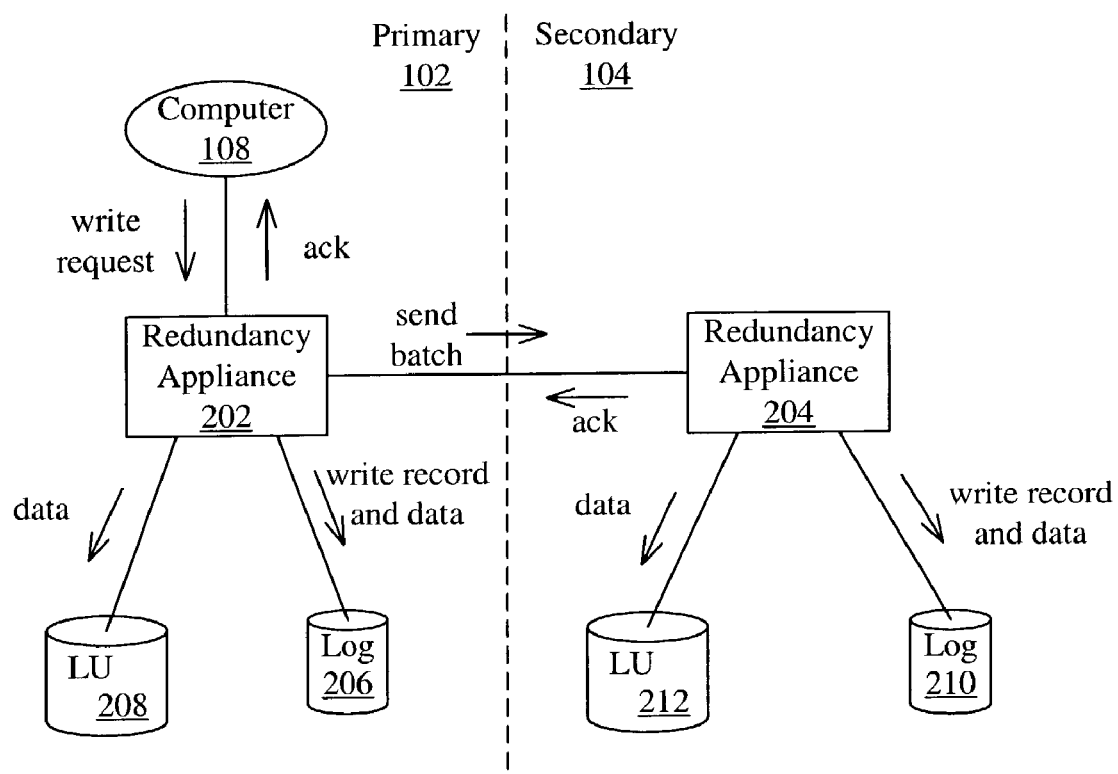
FIG. 2 illustrates operation of the primary and secondary storage facility of FIG. 1 in accordance with an embodiment of the present invention.

FIG. 2 illustrates operation of the primary and secondary storage facilities 102 and 104 of FIG. 1 in accordance with an aspect of the present invention. A redundancy appliance 202 at the primary facility 102 is illustrated in FIG. 2 along with a redundancy appliance 204 at the secondary facility 104. It will be apparent that the appliances 202 and 204 may be implemented by (amongst other examples) appropriately configured hardware, software or firmware in disk arrays, storage devices, hosts (e.g., computer 108), in-host I/O bus adapters, network switches, network hubs, or combination thereof, which may be dedicated to perform the functions of the appliances 202 and 204 as described herein, or which may have shared functionality.

As used herein, a "local" storage facility is typically physically positioned in proximity to the computer 108, whereas a "remote" storage facility is other than the local storage facility and is typically more distant from the computer 108. A "primary" storage facility is currently providing services with respect to a primary copy of the data, while a "secondary" storage facility is other than the primary storage facility and typically acts as a backup by storing data redundantly. Under normal conditions, e.g., in the absence of a fault at the local facility, the local facility typically serves as the primary facility. However, in the event of a fault at the local facility (or under other conditions), the remote facility may assume the role of the primary facility, as explained in more detail herein. Also, the remote facility may function as a primary facility for some data storage operations and as a secondary data storage facility for other data storage operations.

Referring to FIG. 2, when a local facility also serves as the primary facility 102, a write request at the primary facility 102 (e.g., issued by the computer 108) causes a write record to be written into a primary log 206 at the primary facility 102. The write-ordering of the requests in the primary log 206 may be preserved by writing the records synchronously (in the order of occurrence), or by other means, such as appropriate record-keeping. In addition, the corresponding data for the request is written to a primary copy of the data 208, which may be stored as one or more logical units (LUs) at the primary facility 102. An acknowledgement may then be sent to the computer 108 indicating the request was successfully stored by the primary facility 102. In what follows, we use logical units (LUs) as exemplary; any convenient storage entity may be used, including other types of storage devices, files, and databases.

The write record is preferably written to the primary log 206 synchronously with the write request to the primary copy of the data 208 so as to preserve the write-ordering of the requests, however, the data may be written to the primary log 206 asynchronously. The primary log 206 may be stored, for example, in a dedicated storage device (e.g., a disk drive, disk array or section of non-volatile memory (NVRAM)) associated with the appliance 202 at the primary facility 102 or in a storage device that is accessible via a Storage Area Network (SAN), and may be shared with other uses. Preferably, at least the tail portion (i.e., the most recently appended-to part) of the primary log 206 is stored in NVRAM; either because all of it is, or because the log is stored on a device equipped with a non-volatile memory. Preferably, the log 206 is stored in a storage device that is disjoint from any device used to store the primary copy 208 of the data.

The secondary facility 104 may include a redundancy appliance 204, a transaction log 210 and a data repository, e.g., one or more LUs 212.

Figure 3:
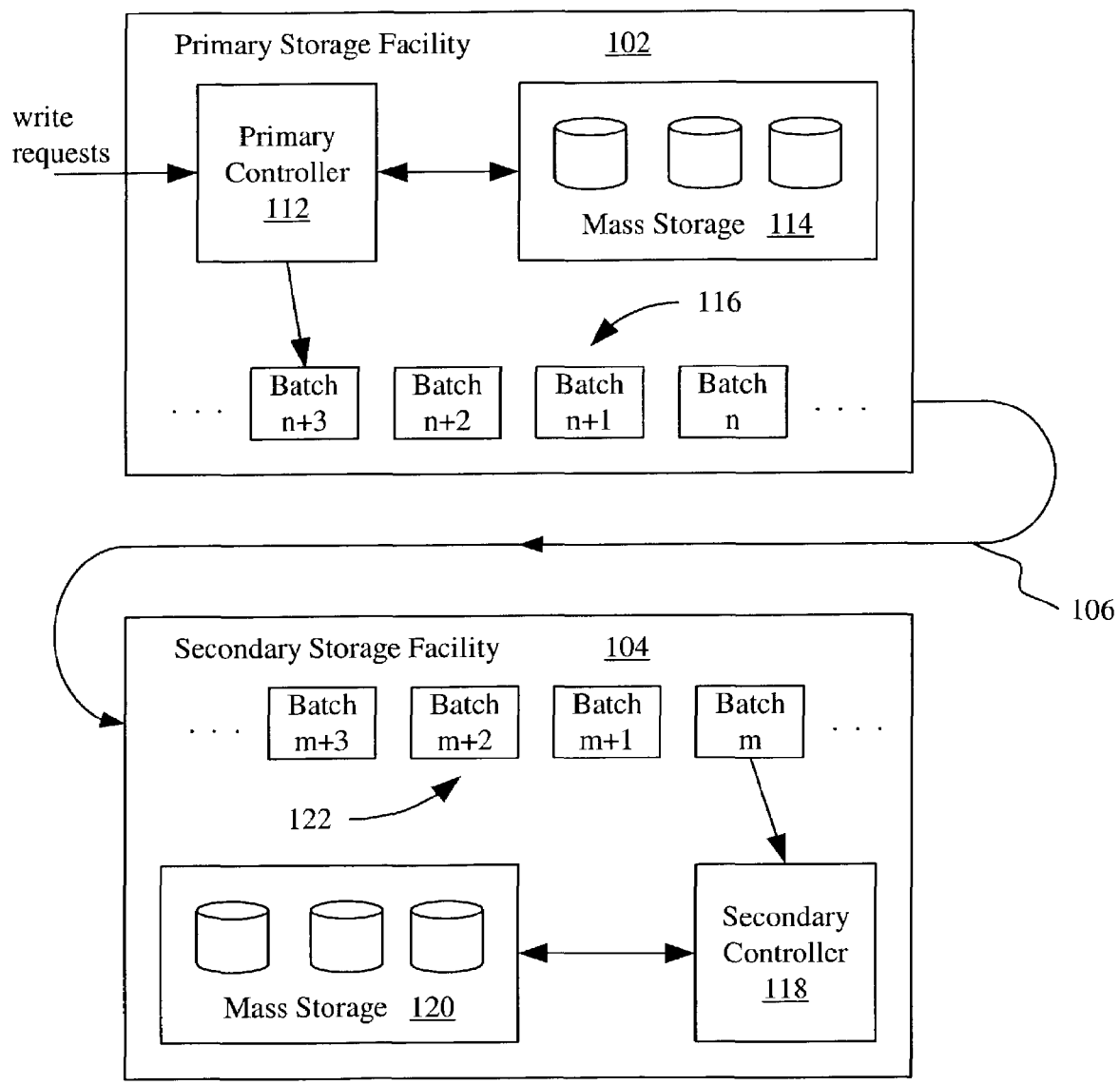
FIG. 3 illustrates the computer system of FIG. 1 in more detail including write queues at the primary and secondary data storage facilities in accordance with an embodiment of the present invention.

FIG. 3 illustrates the primary and secondary storage facilities 102 and 104 of the computer system 100 of FIG. 1 in more detail. As shown in FIG. 3, the primary storage facility 102 includes a primary storage controller 112, a local mass-storage media 114 and a write transaction queue 116. The primary controller 112 includes a processor for controlling operations of the primary storage facility 102, including the storage of data in the mass-storage media 114 and the forwarding of data to the secondary storage facility 104 and, thus, performs the functions of the appliance 202 (FIG. 2). The storage media 114 generally stores the primary copy 208 (FIG. 2) and may include, for example, a disk drive or disk array. The write queue 116 generally stores the primary log 206 (FIG. 2) and may be stored in a disk or disk array associated with the primary storage facility 102; preferably, the write queue 116 is equipped with a non-volatile RAM and is disjoint from the local mass-storage 114 which holds the primary data copy. The primary and secondary storage controllers may be replicated, distributed, mirrored, or otherwise constructed using any of the techniques known in the art for building storage systems.

As mentioned, to store data at the primary storage facility 102, write requests are issued to the primary facility 102. In response, the storage facility 102 stores the data in its local storage media 114. In addition, when the data is also to be stored redundantly at the second storage facility 104, write transactions for the data are inserted into the write queue 116, where they are queued for communication to the secondary data storage facility 104 via communication medium 106 (FIG. 1).

The write queue 116 may function as a first-in, first-out buffer (FIFO) for write transactions. In one embodiment, the write transactions are immediately forwarded from the write queue 116 to the secondary facility 104. In this embodiment, the write transactions may be forwarded in the order they are received by the primary facility.

In another embodiment, a sequence of "snapshots" of the primary LU 208 may be implemented in the log 206. The snapshots may include only the changed data, or they may include a complete copy of the data that is brought up to date when the snapshot is taken (typically—and preferably—by being a mirrored copy of the data that is kept almost up to date so that this does not take too long). Although the invention described herein is preferably implemented using a log, the snapshots can be implemented in another manner.

In another embodiment, the primary storage facility 102 delays forwarding write transactions to the secondary facility 104. In this embodiment, the write transactions are preferably grouped into send batches prior to forwarding them. Overwrites within a send batch may be permitted, though preferably not across batch boundaries. More particularly, a batch of write transactions may be collected over successive time intervals. The batches are, thus, formed one after the other. For example, as shown in FIG. 3, a batch n is formed, then a batch n+1, then a batch n+2, and so forth. Write transactions received during an interval are assigned to the corresponding send batch.

In one aspect, all of a send batch may be forwarded to the secondary storage facility before any of a next send batch is forwarded. Further, the send batches may be forwarded in the order of their formation or in another order. Also, more than one send batch may be forwarded at any one time.

The size of the batches may be based on collection of a predetermined count or aggregate size of write transactions into each batch or a predetermined amount of data to be transferred by the batch. Alternately, the size of the batches may be determined by the duration of successive time intervals over which the batches of write transactions are collected. For example, the intervals may be measured according to time-intervals, e.g., ten or thirty seconds, during which the transactions are to be collected.

If a write transaction received during the interval affects the same data as an earlier operation received during the same interval (and, thus, the later-received operation overwrites the prior data), the later-received operation may replace the earlier operation in the send batch. Multiple write transactions may affect the same data, for example, where the computer 108 issues write requests to store intermediate versions of a data object while the data object is undergoing revision by computer 108 (FIG. 1).

By allowing overwrites at the primary facility 102, the communication bandwidth required between the primary and secondary facility 104 may be reduced because the replaced write transactions are not forwarded. However, collecting write transactions at the primary server 102 tends to increase the quantity of data that could be lost should a failure occur at the primary server 102. This is because write transactions queued at the primary facility 102 reflect changes to the data which have not yet been propagated to the secondary facility 104. Accordingly, write transactions not yet propagated to the secondary facility 104 may be lost in the event of a failure at the primary facility 102.

Accordingly, the size of send batches (and whether write transactions are to be queued at the primary server 102) may be determined based on bandwidth availability between the storage facilities 102 and 104 and/or on the potential adverse consequences of the loss of write transactions in the event of a failure. Further, the batch size may be adjusted adaptively, based on these same considerations.

In one aspect, the level of communication bandwidth available in the medium 106 (FIG. 1) may be detected and used for determining the batch size, in which case, the size of the send batches may be based on a level of traffic detected on the medium 106. When the traffic is heavy, a larger batch size will tend to reduce the added burden on the medium 106. Thus, to conserve communication bandwidth by allowing more overwrites during times of heavy network traffic, the send batch sizes may be increased. Conversely, when the traffic is light, a smaller batch size may be accommodated. Thus, batch size may be reduced in times of lighter traffic. This scheme may be used, for example, where the communication medium 106 is shared by other entities.

In another aspect, the communication medium may be monitored to determine when traffic is sufficiently low that the batch can be accommodated immediately. For example, where the communication medium 106 includes a link dedicated to communications between the first and second facilities, the link may be monitored to determine when it is available (e.g., when it becomes idle). Upon the link becoming available, the current batch may be completed and forwarded along the link.

Figure 4:
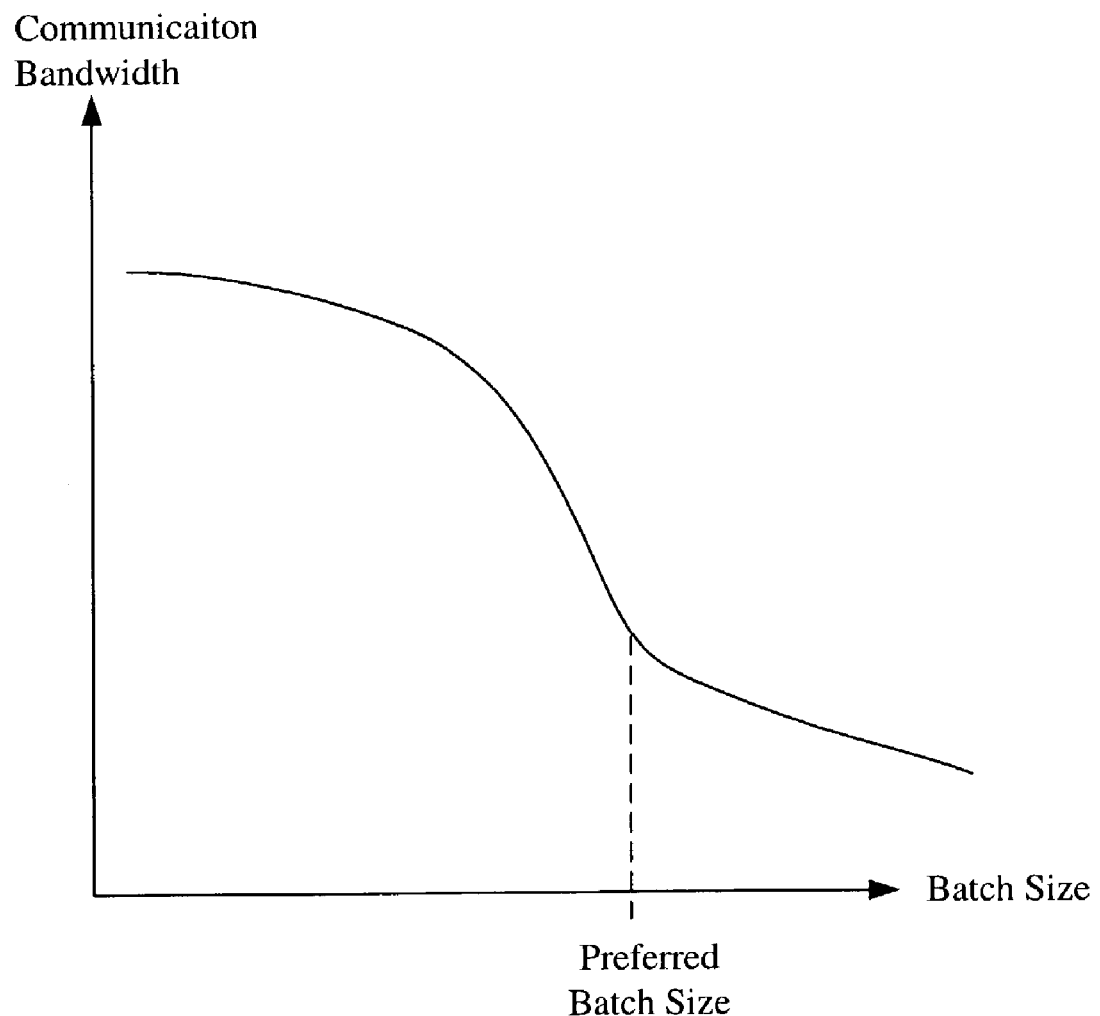
FIG. 4 illustrates an exemplary relationship between communication bandwidth and batch size that may be utilized in accordance with an embodiment of the present invention.

In yet another aspect, the size of send batches may be based on the communication bandwidth consumed by forwarding the batches, in which case, the batch size may be adjusted so as to optimize the trade-off between batch size and communication bandwidth. As mentioned, a larger batch size tends to reduce the bandwidth required to forward the batch by increasing the number of overwrites that may occur, but also increases the amount of data that may potentially be lost if a failure prevents the batch from being forwarded to the secondary facility 104. FIG. 4 illustrates an exemplary diagram showing a relationship between communication bandwidth and batch size that may be utilized. This relationship may be represented by a function and may be determined experimentally, for example, by measuring the bandwidth consumed for each of several different batch sizes. As shown in FIG. 4, increasing the batch size may have a dramatic effect on reducing bandwidth, as shown by the steep slope in the graph, up to a certain point at which the slope is reduced (e.g., an inflection in the graph is reached). Beyond this point, further increases in batch size may have a diminished effect on bandwidth and, thus, the potential for loss of data in the event of a failure will likely tend to outweigh any additional bandwidth savings. A preferred batch size coincides with the change in slope or inflection.

In a further aspect, the send batch sizes may be selected based on the expected time between failures that inhibit forwarding of the send batches to the secondary storage facility 104. For example, the mean time between failures for the primary facility and/or the communication medium 106 may be determined (e.g., experimentally or based on manufacturer's data). Where the expected time between failures is relatively long, this indicates that failures will occur rarely. Thus, a larger batch size may be used since fewer batches will be lost due to such failures. However, where the expected time between failures is short, this indicates that such failures may occur frequently. Thus, a smaller batch size may be used since this data is subject to loss in the event of a failure. Further, once a batch size has been selected, it may be adjusted if further monitoring of the time between failures indicates that failures occur more or less frequently than originally anticipated. For example, where monitoring (e.g., by the primary controller 112) indicates that failures occur more frequently than previously expected, the batch size may be automatically reduced (e.g., by the primary controller 112) and, where failures occur less frequently than previously expected, the batch size may be automatically increased.

When a send batch is completed, new write transactions are collected into the next send batch. For example, when the batch n is completed, subsequent write transactions are collected into batch n+1. Also, once completed, the batch n is ready for forwarding to the secondary facility 104. Preferably, completed batches are forwarded as soon as practical so as to minimize data loss should a failure occur at the primary facility 102 before a batch is forwarded to the secondary facility 104. Accordingly, the batches are preferably communicated to the secondary facility 104 in the order in which they are formed (i.e. n, n+1, n+2, n+3, etc.).

As is also shown in FIG. 3, the secondary facility 104 includes a secondary controller 118, mass-storage media 120, which generally stores the redundant data 212 (FIG. 2) and a write transaction queue 122, which generally stores the log 210 (FIG. 2). Similarly to the primary storage facility 102, the controller 118 of the secondary storage facility 104 includes a processor for controlling operations of the secondary storage facility 104 and, thus, performs the functions of the appliance 204 (FIG. 2). This includes controlling the reception of transactions from the primary storage facility 102 and controlling the storage of data in the mass-storage media 120. The storage media 120 may include, for example, a hard disk array.

In response to receiving write transactions from the primary storage facility 102, the secondary storage facility 104 queues the operations in its write queue 122 and then stores the updated data in its storage media 120. However, the write transactions may not be applied to the redundant data (and, thus, remain in the queue 122) until after a delay has elapsed or a specified event has occurred (or until a combination thereof occurs). Delaying application of the write transactions inhibits the propagation of errors to the redundant data. For example, a software error may occur at the primary facility 102 or at the computer 108 that results in sending corrupted data to the primary copy. By delaying application of the corrupted data to the redundant data at the secondary facility 104, propagation of the error may be halted during the delay interval by avoiding applying the corrupted data.

The write transactions may be queued at the secondary facility 104 in the same order and form in which they are received from the primary facility 102. Thus, where the primary facility 102 forwards the write transactions one at a time, they may be queued individually at the secondary facility 104 in the order they are received. Similarly, where the primary facility 102 forwards the write transactions in batches (e.g., n, n+1, n+2, etc.), the write transactions may be queued at the secondary facility 104 according to the same batches and in the order in which they are received.

In one aspect, the write transactions received from the primary facility 102 are collected into one or more receive batches of transactions at the secondary facility 104. The boundaries of the receive batches collected at the secondary facility need not bear a relationship to those of the send batches collected at the primary facility 102. The receive batches are shown in FIG. 3 by the batches m, m+1, m+2, etc. Thus, where the write transactions are received one at a time, multiple operations may be collected into a receive batch. Where the write transactions are received according to send batches (e.g., n, n+1, n+2, etc.) multiple send batches may be applied as a whole to the mass-storage media 120 (i.e. all of the transactions in that batch are applied or none are). Applying the write transactions as a whole may be performed, for example, by repeatedly re-applying a log of write transactions until all are applied, storing data for the write transactions and a map of the data and then changing the map or by using copy-on-write techniques (in which a prior version of the data is saved in case it is needed again). Thus, overwrites may be allowed across receive batches where write transactions are replaced by later-received write transactions that affect the same data and the receive batches that contain such overwrites are combined into a single receive batch, which will be applied as a whole. Applying the entire batch as a whole avoids the redundant data becoming internally inconsistent—and unrecoverable—as might otherwise occur if the ordering of the write transactions is not preserved across batch boundaries.

Figure 5A:
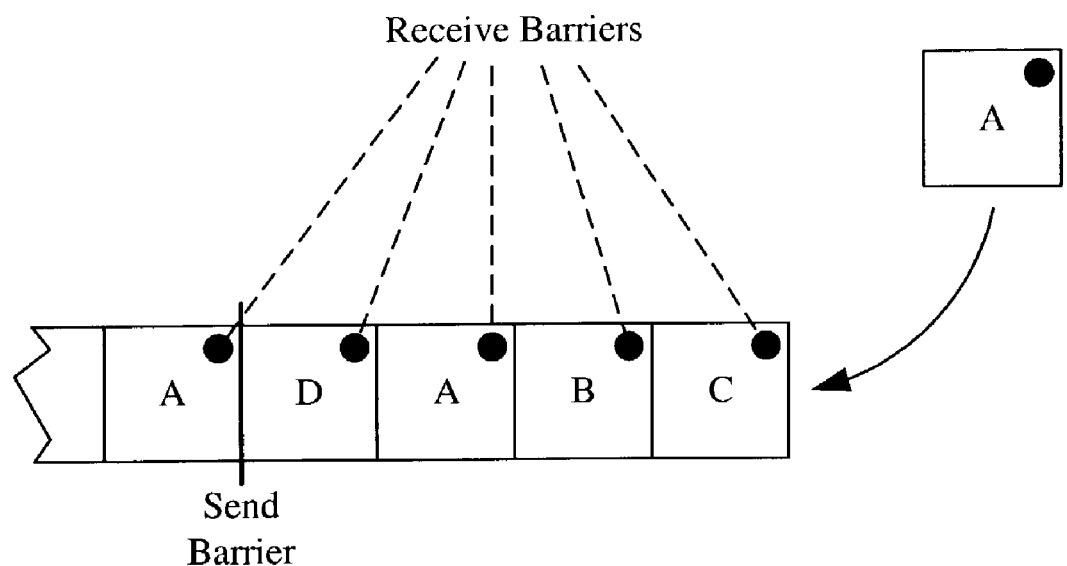
FIGS. 5A–B illustrate send and receive barriers in accordance with an embodiment of the present invention.
Figure 5B:
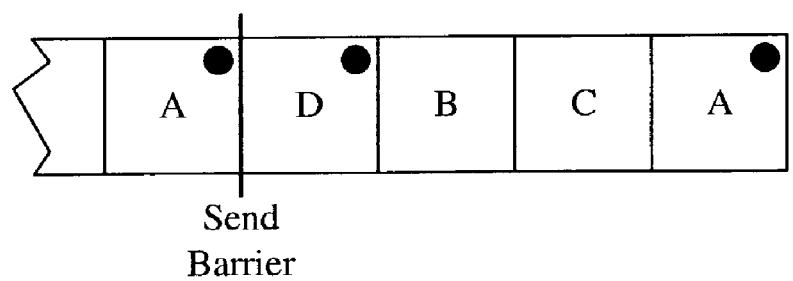

FIGS. 5A–B illustrate send and receive barriers in accordance with an aspect of the present invention. Send barriers may be generated to indicate the boundaries of send batches. As mentioned, overwrites may be allowed within a batch, but not across batches. The send barrier of FIGS. 5A–B indicates the start of a send batch to which new write transactions are to be appended. As mentioned, the size of the send batches can be based on a number of criteria, such as the number of transactions, the amount of data to transfer at a time or a time interval.

Receive barriers bound the sets of transactions or data blocks that are to be applied as a whole (i.e. all the transactions are applied or none are). A receive barrier may initially be associated with each write transaction; that is, each data block may be a receive batch by itself. When a block in the same send batch is overwritten, the earlier write record for that transaction is removed from the queue 122 as are any receive barriers for blocks written between the old copy and the new write transaction. This merges the transactions for blocks that had been separated by receive barriers into the same receive batch. Thus, depending on the circumstances, receive batches may be smaller than send batches.

As shown in FIG. 5A, a series of data blocks A, B, C and D are written to. The corresponding transactions may be entered into the write queue 116 (FIG. 2) in the order in which the transactions occur. In the example, of FIG. 5A, the order is A-D-A-B-C-A, where the last transaction affecting data block A is shown being appended to the queue 116. The send barrier indicates the end of the prior batch and the start of the current batch. Also, shown in FIG. 5A are receive barriers that may be associated with the transactions. When the last transaction to data block A is appended, the prior transaction within the same send batch may be removed (i.e. overwritten). This is shown in FIG. 5B, in which the prior transaction to block A has been removed. In addition, FIG. 5B illustrates that the receive barriers for blocks occurring between the removed transaction and the new ("overwriting") transaction are removed. As such, these blocks need to be written at the secondary facility 104 as a whole to preserve the write-ordering of transactions. Thus, in the example, the transactions to blocks B, C and A are to be written at the second facility 104 as a whole.

Receive batches may be merged at the secondary, by concatenating two or more adjacent receive batches together, and eliminating data overwritten in a later receive batch of those concatenated together. This may be used to reduce the amount of space needed at the secondary; to exploit overwrite activity; to save on metadata information; to reduce processing load; or for any other reason. Batch concatenation may be triggered by detecting one or more of these conditions; such detection may occur at the arrival of a new batch; periodically; on demand; or at any other convenient or appropriate time.

The controller 112 preferably keeps track of the locations of the send barriers and the receive barriers. So that the secondary facility 104 can identify transactions to be applied as a whole, the controller 112 also forwards information sufficient to enable the secondary facility 104 to identify the receive barriers. For example, this information may be sent with the send batch, but may only be required if the send batch and receive barriers do not coincide.

The delay associated with the write queue 122 at the secondary facility 104 may be determined in a number of different ways. For example, where the write transactions are received and applied individually, a timestamp may be associated with each transaction. The timestamp may be created when the transaction is queued at the primary facility 102 or when the transaction is received by the secondary facility 104. Each timestamp may indicate the then-current time, such as time of day. When a timestamp reaches a predetermined age, e.g., 30 seconds, 10 minutes, or 1 day, the timestamp expires, though not all timestamps need to expire after the same amount of time. For example, a timestamp may incorporate its own expiration time. When the timestamp expires, the redundant data 212 (FIG. 2) may be updated in accordance with the transaction. Similarly, where write transactions are received and applied according to send batches (e.g., n, n+1, n+2, etc.) formed at the primary facility 102, a timestamp may be associated with each send batch. The timestamp may be created, for example, when the batch is formed at the primary facility 102 or when the batch is received at the secondary facility 104. Where a single timestamp is associated with multiple transactions, its precision can be approximate. For example, the timestamp may be created when a first, last or an intermediate transaction within the send batch is queued or communicated. Then, when the timestamp expires, the redundant data may be updated in accordance with the batch of operations, where each batch is applied as a whole.

Where the multiple operations are collected in receive batches, a timestamp may be associated with each receive batch. For example, the timestamp for a batch may be formed when the batch is completed. Then, when the timestamp expires (e.g., when it becomes 30 minutes old), the redundant data is updated in accordance with the batch of operations, where each batch is applied as a whole.

Rather than waiting to apply the write transactions to the redundant data according to elapsed time, the write transactions may be queued at the secondary facility 104 until a specified event occurs that indicates that the transactions are safe to apply. For example, a data integrity verification such as virus detection, intrusion detection, verifying a checksum or verification of network logs may be performed on the data to be updated or the original copy, or both, before the operations are applied to determine whether irregularities may indicate that the data may possibly be corrupted. These checks may be performed, for example, at the secondary facility 104 (e.g., by the controller 118) based on transactions in the queue 122 or at the primary facility 102 (e.g., by the controller 112) based on the primary copy of the data or based on a combination thereof.

As another example, applying the updates to the redundant data 212 at the secondary facility 104 may be performed in response to a trigger received from the application at the computer 108 that originated the updates. Alternately, a system administrator may initiate the trigger. In still another example, updates may be based on an external clock-driven event. For example, updates may occur periodically, once each day, week, month, or year. Updates may occur upon certain specified times and dates. Further, a combination of techniques may be applied. For example, a batch of operations may be applied to the redundant data after a specified time interval unless a possible irregularity in the data has been detected through a data consistency check.

If a possible irregularity has been detected, further updates to the redundant data may be halted until further investigation is performed, such as by a system administrator. Accordingly, multiple batches may be queued at the secondary facility 104. In the event that the write queue 122 fills up, further updates to the primary copy at the primary facility 102 may be blocked. Alternately, rather than blocking the write transactions, the transactions may be stored at the primary facility 104 (e.g., as a single large group); if even that is insufficient, the transactions may simply be remembered in a manner that requires a fixed, known amount of space (e.g., by a bitmap-like structure of updated blocks, tracks, segments, or cylinders), and updates to the primary copy allowed to proceed. For example, a system administrator may select between blocking the updates and storing them at the primary facility.

In one aspect, the size of the receive batches m, m+1, m+2, etc. may be determined according to time intervals. For example, new receive batches may be started at specified time intervals. These time intervals may be the same as or different from any time interval used for delaying application of a batch. Alternately, the size of the receive batches may be determined according to the predetermined quantity (e.g., by a number of transactions or send batches or by storage capcity consumed) to be included in the receive batch. By increasing the size of the receive batches and/or the amount of time they are queued at the secondary facility, this will tend to increase the opportunity for preventing errors from propagating to the redundant data. However, this will also tend to increase the size of the queue needed in the secondary facility 104 which will tend to increase its cost. Accordingly, a trade-off can be made based on cost and the potential adverse consequences of error propagation. Further, the receive batch size may be adjusted adaptively, such as based on the available space for the write queue 122 in the secondary facility 104. Thus, to conserve space by allowing more overwrites, the batch sizes may be increased.

As described, a single write queue 116 and 122 may be present at each of the primary facility 102 and the secondary facility 104. In which case, write transactions directed to different data objects, such as files or logical units (LUs), may be queued together. Alternately, multiple write queues may be maintained at either or both of the primary and secondary facilities 102 and 104. For example, a separate write queue may be associated with each file being updated or with each LU, or with a "consistency group" of LUs that must be updated consistently).

Figure 6:
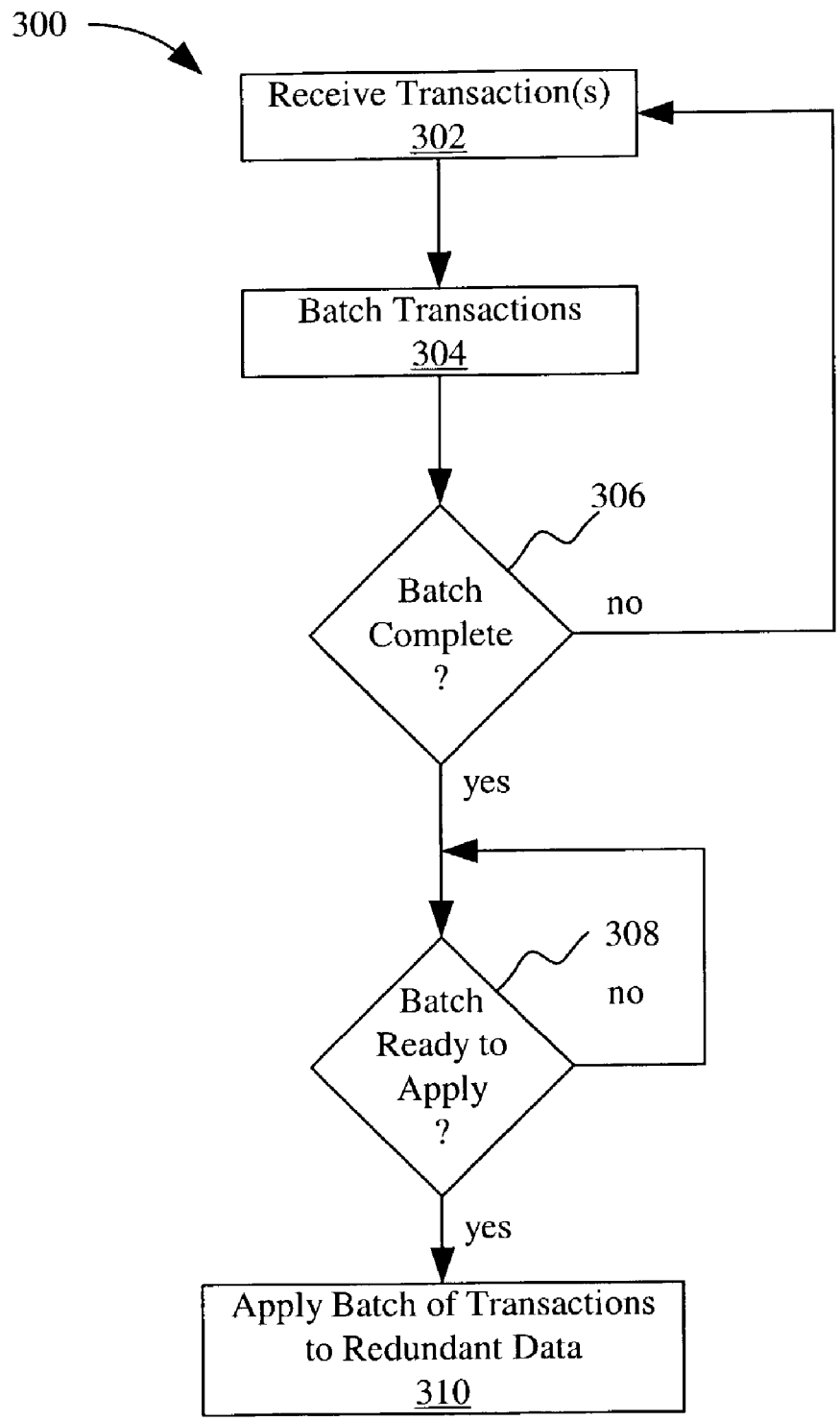
FIG. 6 illustrates a flow diagram for queuing and applying a batch of transactions at the secondary facility in accordance with an embodiment of the present invention.

FIG. 6 illustrates an exemplary flow diagram of a method 300 for queuing and applying a batch of transactions at a secondary storage facility 104 in accordance with an aspect of the invention. Performance of the steps of the method 300 may be performed under control of the secondary controller 118 (FIG. 3). In step 302, one or more write transactions are received into the write queue 122 (FIG. 3) at the secondary facility 104. As mentioned, the write transactions may be received one at a time or in groups (e.g., n, n+1, n+2, etc.). In step 304, the operations are preferably collected into batches (e.g., m, m+1, m+2). This may include replacing an earlier operation with a later-received operation that affects the same data. As shown in FIG. 2, this step includes sending write records and corresponding data to the log 210.

In step 306, a determination is made as to whether the current batch is complete. As mentioned, this determination may be based, for example, on a time interval for collecting operations into the batch or upon the number of operations or quantity of data to be included in the batch. If the batch is not complete, program flow may return to step 302 for collecting additional operations as needed to complete the batch. Once the batch is complete, program flow moves from the step 306 to a step 308. Meanwhile, a subsequent batch may be formed in the same manner.

In step 308, a determination may be made as to whether the completed batch is ready to be applied to the redundant data at the mass-storage media 120. As mentioned, this determination may be based on elapsed time, a specified event (e.g., a data consistency check) or a combination thereof. If the batch is not ready to be applied, program flow may remain in the step 308 until the batch is ready to be applied. Note that if an excessive time elapses, a timeout error may be indicated in step 308 or if a check of the data to be applied indicates an irregularity, a data integrity error may be indicated in step 308. When an error is indicated, the process applying batches at the secondary facility 104 is preferably halted until the source of the error is resolved. As mentioned, under these circumstances, transactions may be halted at the primary facility 102 or may be stored at the primary facility 102.

Assuming it is determined in step 308 that a batch is ready to be applied (i.e. committed) to the redundant data 212 (FIG. 2), the batch is applied in step 310. Meanwhile, the determination of step 308 may be made relative to a subsequent batch. In this manner, multiple batches are successively queued in the secondary storage facility 104 and applied to the redundant data at the secondary storage facility. As shown in FIG. 2, data for a batch is applied by sending it to the LU 212. As also shown in FIG. 2, once the data for a batch (e.g., a send batch) has been applied, the secondary 104 may send an acknowledgement to the primary 102.

Thus, an asynchronous redundancy technique has been described in which write transactions are queued at a secondary storage facility so as to inhibit propagation of errors, for example, in the event of a software error at a primary storage facility, and so as to minimize loss of data in the event of a failure at the primary storage facility.

Figure 7:
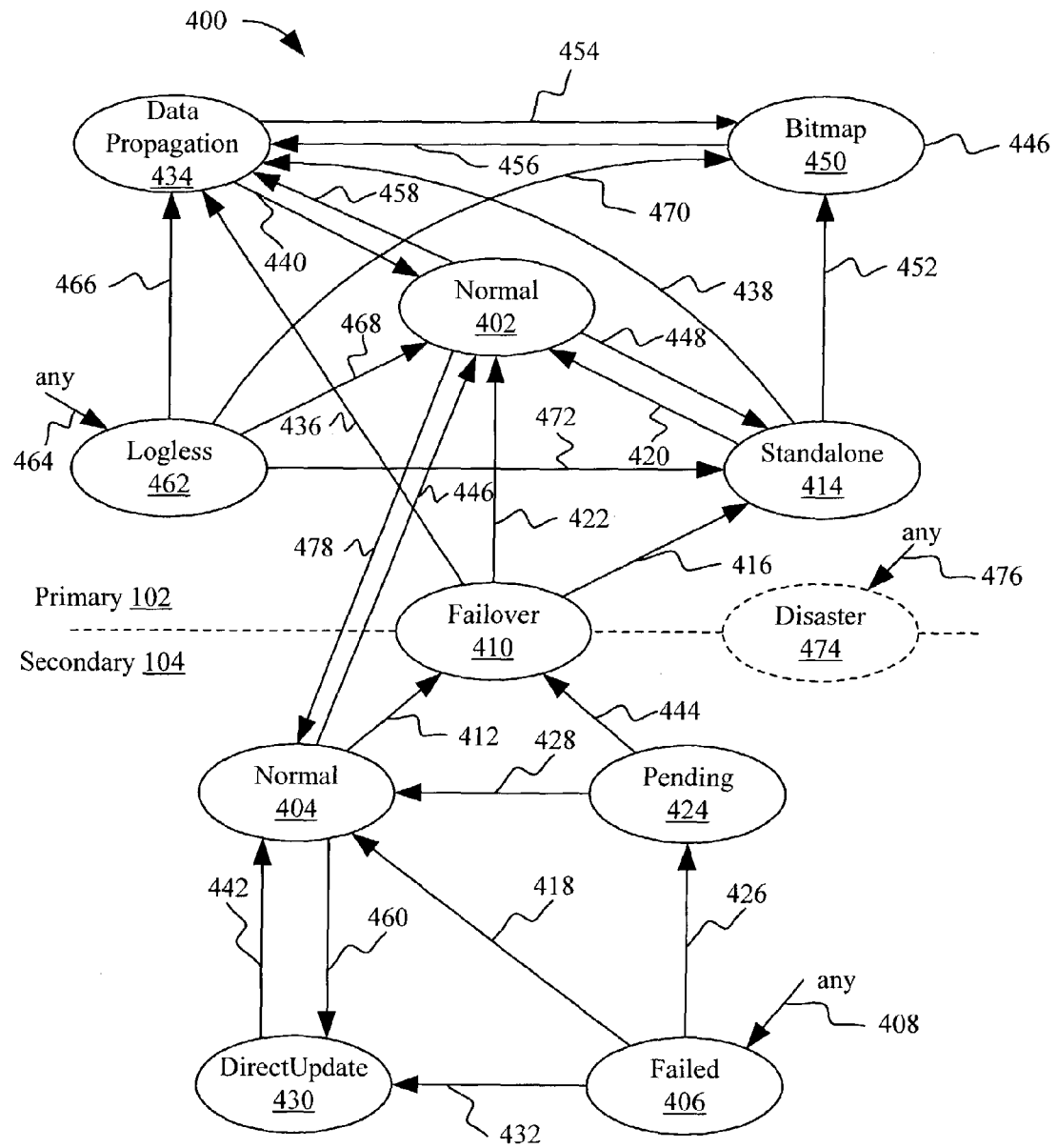
FIG. 7 illustrates a state machine for controlling operation of the primary and/or secondary data storage facilities of FIG. 1 in accordance with an embodiment of the present invention.

FIG. 7 illustrates a state machine 400 for controlling the operation of the primary data storage facility 102 and/or the secondary data storage facility 104, in accordance with an aspect of the invention. The state machine 400 of FIG. 7 may be implemented, for example, by the appliances 202 and 204 of FIG. 2 which may include appropriately configured hardware, software or firmware in disk arrays, storage devices, hosts (e.g., computer 108), in-host I/O bus adapters, network switches, network hubs, or combination thereof, which may be dedicated or may have shared functionality.

In a preferred embodiment, the state machine 400 controls operation of a local data storage facility, while a duplicate instance of the state machine 400 controls operation of a remote storage facility. Because both facilities may be controlled by state machines having substantially the same set of states, only one state machine 400 is illustrated in FIG. 7. It will be apparent, however, that two or more such state machines 400, provided at local and remote sites, may be operative at any one time.

The state machine 400 is divided generally into two regions, as shown by the horizontal dotted line in FIG. 7, depending upon whether the facility is acting as a primary facility (e.g., 102 of FIG. 1) or as a secondary facility (e.g., 104 of FIG. 2). More particularly, the states above the dotted line control operation as a primary facility, while the states below the dotted line control operation as a secondary facility.

Assuming the facility is acting as a primary facility, and under normal operating conditions (e.g., in absence of a fault at the primary facility), operation is controlled by a "normal" state 402 (such state names are merely exemplary). If the facility is acting as a secondary facility under normal operating conditions, operation is controlled by a "normal" state 404. When the local and remote facilities are both in their normal states 402 and 404, respectively, the system 100 may operate generally as described above in which updates are forwarded from the primary facility 102 to the secondary facility 104.

Certain faults may occur with respect to a primary facility 102. These include, for example, the primary log 206 becoming filled to a predetermined capacity, a failure of the storage device(s) that hold the primary log 206, a failure of the storage device(s) that hold the primary copy 208 of the data, a failure which renders the local facility inoperative, such as a failure of the appliance 202, or a failure that renders the remote facility inaccessible to the local facility or inoperable, such as a failure of the storage device(s) that hold the secondary log 210 or the redundant data 212, a communication failure (e.g., in medium 106 of FIG. 1) or a failure of the appliance 204.

After such a fault, one or more recovery events may occur. For example, after a failure of the primary log 206, the primary log 206 may become operational again, such as by repair or replacement of a failed storage device that stores the log 206. Also, after a fault at the remote facility or a fault that renders the remote facility inaccessible to the local facility, the remote facility may be returned to service. Upon returning to service, the remote facility may still contain its redundant copy of the data 212 and the secondary log 210 or the remote facility may be treated as empty of data.

Other fault and recovery events may occur with respect to the secondary facility 104. Possible faults include, for example, the secondary log 210 becoming filled to capacity, or a failure that causes the local facility (acting as the primary 102) to cease sending updates to the secondary copy 212, or a failure of the remote facility, such as a failure of the storage device(s) that hold the redundant data 212 or a failure of the appliance 204. Possible recovery events include, for example, returning the remote facility to service. Upon returning to service, the remote facility may still contain its redundant copy of the data 212 and the secondary log 210 or the remote facility may be treated as empty of data.

Referring again to FIG. 7, when the local facility (which was operating in normal state 402) experiences a fault so that it is essentially inoperative, it ceases acting as the primary 102. This is illustrated in FIG. 7 by a "failed" state 406 (which may be entered via transition 408). In addition, the remote facility may cease acting as the secondary 104 and, instead, the remote facility enters a "failover" state 410 from its normal state 404 (via transition 412). The secondary facility 104 may not detect when the primary 102 has failed since this may appear the same to the secondary 104 as though the primary 102 is simply quiet. Thus, entry into the failover state 410 may require intervention, for example, by a system administrator after the fault at the primary 102 has been discovered. Alternately, certain failures of the primary facility 102 may be detected, for example, by the primary 102 and the secondary 104 periodically exchanging status or keep-alive messages. If the primary facility 102 fails to send one or more expected messages or sends a message indicating failure has occurred, the secondary 104 may recognize that a fault has occurred at the primary 102 so that it may automatically take action.

In the failover state 410, the remote facility prepares to function as the primary facility 102. This includes the remote facility committing any data in its secondary log 210 to the redundant data 212. During the failover state 410, write requests from the computer 108 may be paused during which time the computer 108 queues the requests. The remote facility then assumes the role of the primary 102 so that request traffic from the computer 108 is redirected to the remote facility. Redirecting the traffic may be accomplished, for example, by the remote facility sending an appropriate notification to the computer 108; alternately, one or more other host computers may assume the role of computer 108 after the failover.

If the local facility has not recovered by the time the remote facility assumes the role of primary 102, the remote facility enters a standalone state 414 from the failover state 410 (via transition 416). In the standalone state 414, the primary facility 102 appends new entries to its primary log 206, and accesses and updates data 208. However, because the local (now: secondary) facility has been determined to be unavailable, the new entries are not propagated to the secondary 104.

Thus, a technique has been described in which state machines are employed to cause a remote facility to assume the role of primary in the event of a fault affecting the local facility. Changes in roles between the facilities can be in response to other events (referred to herein as "failover" events), such as a fault affecting the remote facility or a fault affecting a communication medium between the facilities, or an operational condition, such as a manually initiated event (e.g., a system administrator initiating the change in roles) or an automatically initiated event (e.g., the change is prearranged to occur at a particular time), or in response to communication traffic conditions (e.g., a greater portion of request traffic originating closer to the second data storage facility—explained in more detail herein).

Eventually, the local facility may recover. Assuming the local facility becomes functional again, it preferably resumes operation as the secondary 104. However, before resuming operation as the secondary 104, the local facility preferably attempts to ensure that its data is consistent with that in the remote facility (acting as the primary 102). More particularly, the local facility determines whether it still has its copy of the data intact (now, the redundant data 212) and, if so, whether its data is up-to-date with respect to the primary copy 208. This resumption of a previous role by one of the facilities may be referred to as a "fallback" event and may be performed in response to conditions other than a fault or a fault recovery (at the primary, the secondary or a communication medium between the primary and secondary), including those events described previously as failover events.

For example, recovery of the local facility may be detected by the remote facility (acting as the primary 102) if the local facility resumes sending keep-alive or status messages. In response, the remote facility (primary 102) may signal the local facility that the primary has updates in its primary log 206. Alternately, upon becoming functional, the local facility may send a request for updates to the remote facility to determine whether the primary log 206 at the remote facility (acting as the primary 102) is empty.

If the log 206 is empty, this indicates that the data at the local and remote facilities is consistent. If the local facility recovers with its data intact and there is no inconsistency, it may transition from the failed state 406 directly to the normal state 404 (via transition 418). In the normal state 404, the local facility functions as the secondary facility 104. In addition, the remote (now: primary) facility may enter the normal state 402 from the standalone state 414 (via transition 420). Alternately, depending upon which state the remote facility was in, it may enter the normal state 402 from the failover state 410 (via transition 422). In normal state 402, the remote facility functions as the primary facility.

However, if there are records in the primary log 206, this means there is an inconsistency between the data held at the local and remote facilities. Accordingly, the local facility may transition to a pending state 424 (via transition 426). In the pending state 424, a backup for the primary log 206 is forwarded to the local facility. In addition, the remote facility may transition to the normal state 402 (via transition 420 or 422). The updates are sent to the log 210 and then committed to the redundant data 212 at the local (now: secondary) facility. Once these records are committed, the local facility may transition from the pending state 424 to the normal state 404 (via transition 428).

If the local facility was failed for an extended period of time or has lost its data (e.g., repairs may have required replacement of its storage devices with empty ones), the amount of data required to update the local facility before it can begin normal operation as the secondary 104 may be expected to exceed the capacity of its secondary log 210. Thus, the entire contents of the data to be stored redundantly (a "snapshot" of the primary copy 208) may be sent to the local facility. In this case, the local facility (acting as the secondary 104) moves to a direct update state 430 (via transition 432). In addition, it may signal the primary facility 102 to enter a data propagation state 434 (via transition 436 or 438). In the data propagation state 434, the entire contents of the data to be stored redundantly (a "snapshot" of the primary copy 208) may be sent from the remote facility to the local facility. This may include condensing the data, such as by using known techniques for data compression.

Then, the remote facility (operating in the state 434) sends the condensed data to the local facility (operating in the update state 430) which commits the data to the redundant version 212, preferably bypassing the secondary log 210. Once the entire snapshot is committed to the redundant data 212, the remote facility may enter the normal state 402 (via transition 440), while the local facility may enter the normal state 404 (via transition 442).

As described, from the failed state 406, the local facility may move to the normal state 404, to the pending state 424, or to the update state 430, depending on the circumstances. Also, from the failover state 410, the remote facility may enter the normal state 402, a standalone state 414, or the data propagation state 434, depending on the circumstances. Moreover, the local facility may move from the pending state 424 to the failover state 410 (via transition 444) in the event that the remote facility experiences a fault before the local facility enters the normal state 404.

Once the remote facility has entered the normal state 402 and the local facility has entered the normal state 404, the facilities have exchanged roles. Thus, a technique has been described in which state machines are employed to exchange the roles of primary and secondary between local and remote facilities.

To change back, the two facilities commit all of the outstanding updates and then resume their original roles. This may be accomplished by the local facility, which was operating as the secondary 104 in normal state 404, transitioning to normal state 402 (via transition 446) and resuming functioning as the primary 102. Also, the remote facility, which was operating as the primary 102 in normal state 402, transitions to the normal state 404 (via transition 478) and resumes functioning as the secondary 104. Request traffic from the computer 108 is also redirected to the local facility.

Returning the local facility to its role as primary 102 and returning the remote facility to its role of secondary 104 is preferably performed when traffic between the two facilities is quiet. This may be accomplished by an application that is running on the computer 108 initiating the role reversal during a period that the computer 108 does not require access to the primary facility 102. Alternately, either of the facilities 102, 104, may signal the other and the computer 108 to initiate the role reversal.

Thus, a technique has been described in which state machines are employed to return the local and remote facilities to their original roles.

As described, the exchanging of roles may be performed in response to a fault, or it may be initiated in response to other conditions. For example, the origin of storage request traffic within the system 100 may be used to reverse the roles of the storage facilities. More particularly, in a distributed system, multiple host computers 108 at different locations may access the primary facility 102 for performing storage operations. During certain periods, the greatest portion of requests to the primary 102 may be originated by computers 108 that are physically closer to the secondary 104. Under these circumstances, efficiency would tend to be increased if the role of the primary facility was shifted closer to the origin of the communications as this would shorten the communication distances (e.g., by reducing the amount of system traffic and communication latencies). Accordingly, the origins of storage requests may be monitored by the primary facility 102 (e.g., as an operation performed in the normal state 402). Based on relative locations of the local facility, the remote facility and the origins of the requests, the primary facility 102 may determine that it would be more efficient to shift its role to the remote facility or to the local facility. In response, the roles may be shifted, as needed, depending upon the current traffic patterns.

During normal operation in which the primary facility 102 is in state 402 and the secondary facility 104 is in state 404, a fault may occur in which the secondary facility 104 becomes inoperative. Under these circumstances, the secondary facility 104 may enter the failed state 406. Upon recovery, the secondary facility 104 may return to the normal state 404 directly, or via the pending state 424 or the update state 430, as described above.

From the perspective of the primary facility 102, a fault at the secondary facility 104 or a communication failure between the primary 102 and secondary 104 may result in the secondary 104 becoming unavailable to the primary 102. These faults may be detected by periodically exchanging keep-alive or status messages between the secondary 104 and the primary 102 during normal operation. Absence of the messages from the secondary 104 indicates the secondary 104 is unavailable. In response, the primary facility 102 may enter the standalone state 414 from the normal state 402 (via transition 448).

If the secondary 104 recovers while the primary 102 is in the standalone state 414, the primary 102 may return to the normal state 402 (via transition 420). The updates logged at the primary facility 102 may then be forwarded to the secondary facility 104 (while the secondary 104 is in pending state 424). However, if the primary log 206 becomes filled to capacity before the secondary facility 104 becomes available, the primary facility 102 may transition from the standalone state 414 to a bitmap state 450 (via transition 452).

In the bitmap state 450, the primary facility 104 effectively condenses the logged records using a bitmap or other type of change record. Thus, the bitmap takes the place of the entries in the log 206. The bitmap is a record that includes an indication for each data block of the primary copy 208 that has changed. For example, the bitmap may include a logical "zero" or "one" for each data block of the primary copy, where a logical "one" indicates that the block has changed since it was last propagated to the secondary. Thus, unlike the log 206, which includes the changes to the data, the bitmap only indicates whether the data for a block has changed. The write-ordering of the changed portions is generally not preserved by the bitmap. While the primary 102 is in the bitmap state 450, any new updates are incorporated into the bitmap. Because write-ordering is not preserved, the bitmap specifies a large batch of updates that preferably are be committed to the redundant data 212 at the secondary 104 as a whole. Thus, if the secondary 104 recovers while the primary is in the bitmap state 450, the primary 102 transitions to a data propagation state 434 (via transition 456). In this state 434, the data blocks indicated by the bitmap are propagated to the secondary 104, where they are preferably committed to the redundant data 212 as a whole. If the secondary 104 becomes unavailable again while primary 102 is in the data propagation state 434, propagation of the data is halted and the primary 102 returns to the bitmap state 450 (via transition 454) where the primary 102 continues to incorporate new updates into the bitmap.

When the primary 102 is in the standalone state 414 because the secondary 104 is unavailable, the secondary 104 may recover without its redundant data. For example, either or both of the secondary log data 210 or the redundant data 212 may be lost if the secondary facility 104 is replaced or repairs required replacement of its storage devices. Similarly to the situation described above in which the local facility resumes operation as secondary 104 after a fault, under these circumstances, the entire contents of the primary copy 208 may need to be sent to the secondary 104. Thus, primary facility 102 transitions from the standalone state 414 to the data propagate state 434 (via transition 438) in which a complete snapshot of the primary copy 208 is propagated to the secondary 104, if needed. Updating the secondary 104 occurs with the secondary in the update state 430. Preferably, all changes are committed to the secondary 104 as soon as practical to limit any inconsistency with the data at the primary 102.

Thus, a technique has been described in which state machines are used to provide redundant data to a remote facility that experienced a fault.

While in the normal state 402, the primary log 206 may become filled though the secondary 104 is still accessible. For example, a burst of requests from the computer 108 or heavy traffic on the communication medium 106 between the primary 102 and secondary 104 may result in the primary log 206 becoming filled. In response, the primary facility 102 may transition to the data propagation state 434 (via transition 458) in which the primary log 206 may be condensed to a bitmap and the corresponding data updates propagated to the secondary 104. As a result, the primary log 206 is emptied. Meanwhile, the secondary 104 may transition from its normal state 404 to the update state 430 (via transition 460). When propagation of the data is complete, the primary facility 102 may return to the normal state 402 from the data propagation state 434 (via transition 440) and the secondary facility 104 may return to the normal state 404 (via transition 442).

In the event that the primary log 206 fails, the primary facility 102 may enter a logless state 462. The logless state 462 avoids use of the primary log 206 and may be entered from any of the other states for the primary facility 102 (via transition 464). The logless state 462 is useful when a storage device which holds the primary log 206 fails or otherwise becomes inaccessible. In the logless state 462, the primary copy 208 is updated in response to write requests from the computer 108; however, the redundant data 212 is not updated since the primary log 206 is not available for this purpose.

To recover after the primary log 206 becomes available, the entire snapshot of the primary copy 208 may be propagated to the secondary 104 by the primary 102 transitioning to the data propagation state 434 (via transition 466). The secondary 104 transitions to the update state 430 (via transition 460). Then, operation may resume in the normal states 402 and 404. However, if the primary log 206 recovers before any updates cause the redundant data 212 to become inconsistent, the propagation state 434 may be bypassed (via transition 468) so that operation resumes in normal state 402 or in the bitmap state 450 if the primary log 206 is filled upon its recovery (via transition 470). Further, if the secondary 104 should become unavailable by the time the primary log 206 recovers, then the primary 102 may transition to the standalone state 414 from the logless state 462 (via transition 472).

When the secondary 104 is in the normal state 404, its secondary log 210 may become filled. Under these circumstances, the secondary 104 transitions to the update state 430 in which updates are propagated directly to the redundant data 212, bypassing the secondary log 210. By so doing, the redundant data 212 may become inconsistent with that of the primary 102; however, this is generally preferable to preventing updates to the redundant data 212. A snapshot update may eventually be performed (e.g., in the state 430) to bring the secondary 104 back into consistency.

Under certain circumstances, faults may be essentially unrecoverable. This is shown by a disaster state 474 in FIG. 7, which may be entered from any state by transition 476. For example, assume one of the facilities has failed and the remaining, non-failed facility in is the standalone state 414. If the remaining facility should fail before the failed facility recovers, the system 100 may be left in a state from which it cannot recover without intervention (e.g., a system administrator may be able to repair the system) or in a state in which it is unable to respond to new write requests from the computer 108. Also, if the primary 102 facility fails while the secondary facility 104 is in the direct update state 430, intervention will likely be required to restore the system 100 to operation.

Thus, state machines have been described for local and remote facilities, in which each facility is able to cope with a variety of events.

As explained above, when the primary 102 experiences a fault, applications can fail over onto the secondary facility 104, which becomes the new primary facility. Data left in the primary log 206 prior to the fault occurring at the local facility is essentially considered lost and new data is written to the remote facility acting as the new primary facility. When the local facility recovers, the data in its LU and log may be inconsistent with that in the new primary facility. In other words, each of the facilities may have a piece of data that the other does not have.

In some circumstances, in response to this inconsistency, it may be desirable for a system administrator or application-level utility to attempt to reconstruct the data so as to minimize or eliminate data loss. In other circumstances, it may be desirable to accept the potential loss of data by undoing some of the updates. This eliminates the inconsistency and allows operation of the system to continue. In one aspect of the invention, a technique is provided for automatically responding to such a data inconsistency, as explained below.

Figure 8:
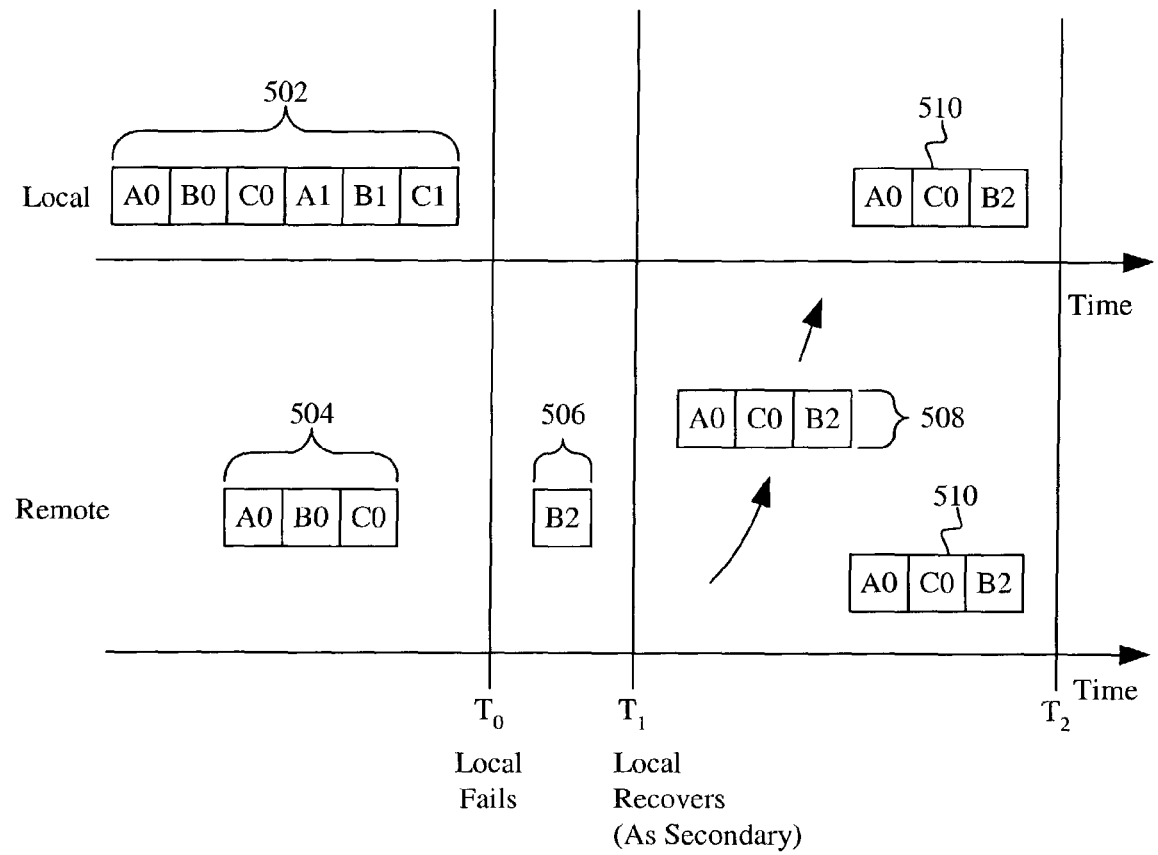
FIG. 8 illustrates an example of update and back-up copy propagation during failover and recovery in accordance with an embodiment of the present invention.

FIG. 8 illustrates an example of update and back-up copy propagation during failover and recovery in accordance with an aspect of the present invention. As shown in FIG. 8, data blocks are written to sequentially in time at a local storage facility acting as the primary storage facility 102. This is shown by a sequence 502 including versions A0, B0, C0, A1, B1, C1 of data blocks A, B and C. Because the data block version A0 is the left-most block in the diagram, this means that the data block A was written to first. In the example, the data block B is written to next, as shown by version B0, and, then, the data block C, as shown by version C0. Next, the data block A is written to again, as shown by version A1. The data blocks B and C are then written to again, as shown by versions B1 and C1, respectively. It will be apparent that the ordering of writing the blocks is exemplary and will depend on the applications that generate the storage activity.

Meanwhile, updates to the data blocks A, B, C are sent to the remote facility acting as the secondary facility 104. This is shown in FIG. 8 by the sequence 504 including versions A0, B0, C0 of data blocks A, B and C. Some delay is associated with sending the updated versions A0, B0 and C0 to the remote facility; accordingly, they are shown as being stored at the remote facility later in time.

Then, assume that at time $T_0$, the local facility experiences a failover event (e.g., a fault). In response, the remote facility assumes the role of primary 102. Thus, after time $T_0$, new updates are only stored at the remote facility. This is shown by an update 506, including an updated version B2 of the data block B.

Assume that the local facility recovers at a time $T_1$. At the time that the fault occurred ($T_0$), some of the versions A0, B0, C0, A1, B1 and C1 may have been committed to the primary copy 208 (FIG. 2), though others may not. In addition, because of the fault, it may not be possible to determine which versions have been committed. Thus, after recovery (after the time $T_1$) the local facility sends a request to the remote facility for its current copy of committed data (e.g. committed data blocks), referred to as a "backup" of the data. In the example of FIG. 8, the backup batch 508 is shown to include versions A0, C0 and B2. The backup 508 includes A0 and C0 from the sequence 504 and B2 from the update 506. If no blocks had been written during the interval between $T_0$ and $T_1$, the update 506 would be empty and the backup 508 would include versions A0, B0 and C0.

The backup 508 is preferably sent to the local facility as a single batch, which is committed at the local facility as a whole. As explained above in reference to FIG. 7, propagation of the backup 508 may be performed while the local facility is in the pending state 424. Note that versions A1, B1 and C1 are omitted from the backup 508 since they are not present at the remote facility. Thus, at the time $T_2$, the data at both facilities is consistent, while some data has been lost (i.e. A1, B1 and C1). In particular, at time $T_2$ each facility has committed data 510, including versions A0, C0 and B2. Because the operations that result in data consistency may be performed under control of the state machines 400 (FIG. 7), they may be performed automatically. For example, forwarding the update 508 may be performed in pending state 424 of FIG. 7, while the local facility is preparing to resume operation as the secondary. Thus, operation from a state of data consistency can proceed without requiring human intervention.

Figure 9:
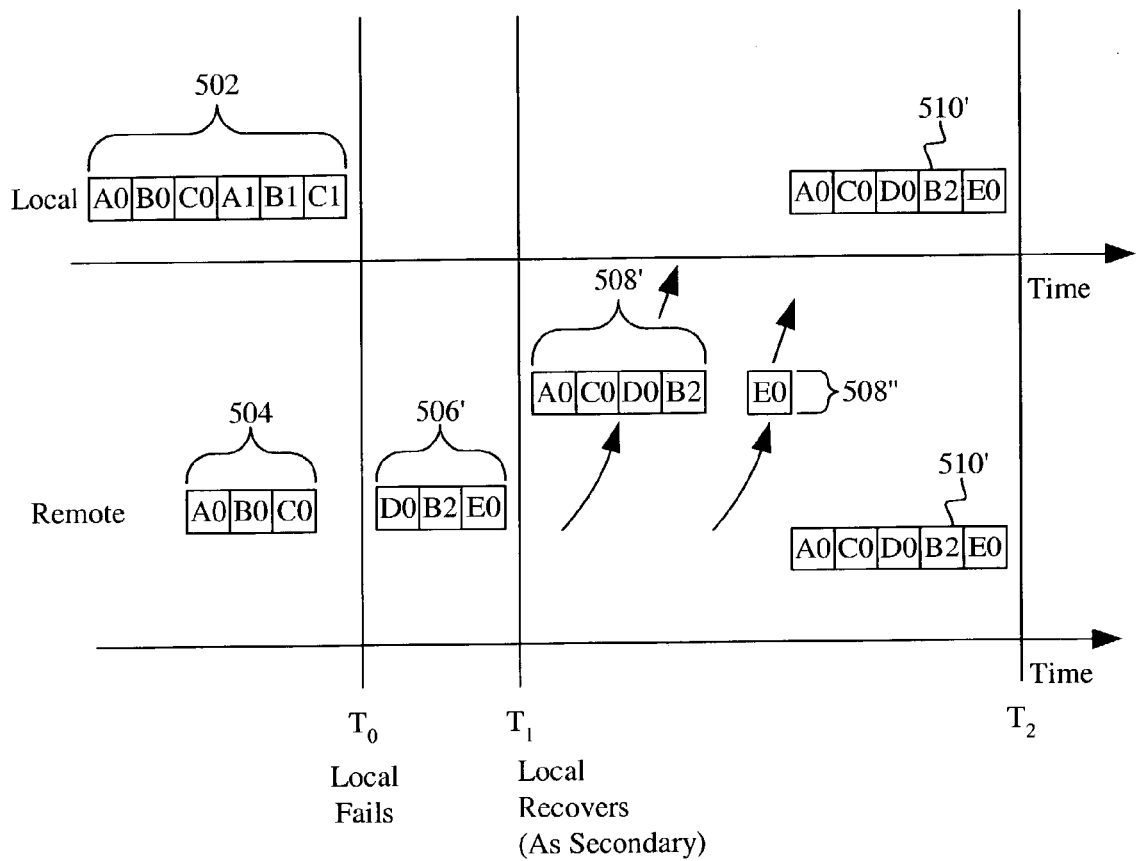
FIG. 9 illustrates a second example of update and back-up copy propagation example during failover and recovery in accordance with an embodiment of the present invention.

In another example, some additional data blocks may have been written after the local facility experienced the fault, but before its recovery. This is shown in FIG. 9, in which versions D0 and E0 of data blocks D and E were also written between the time $T_0$ and $T_1$. The backup is thus expanded to include all other blocks that were written to before the committed blocks A, B and C. This is shown in FIG. 9 by the backup 508' which includes the versions A0, C0, D0 and B2. Because version D0 was written before B2 in update 506' of FIG. 9, the backup 508' needs to include D0 and also needs to be committed as a whole to maintain data consistency. Note that version E0 can be omitted from this batch and sent later. This is because E0 was written after the version B2 in the update 508' and, thus, it can be propagated after the update 508', in a second update 508". Alternately, E0 could be included in the update 508'.

As shown in FIG. 9, at time $T_2$, the data at both facilities is consistent, while some data has been lost (i.e. A1, B1 and C1). In particular, at time $T_2$ each facility has committed data 510', including versions A0, C0, D0, B2 and E0. These operations that result in data consistency may be performed under control of the state machines 400 of FIG. 7 and, thus, may be performed automatically without requiring human intervention.

Figure 10:
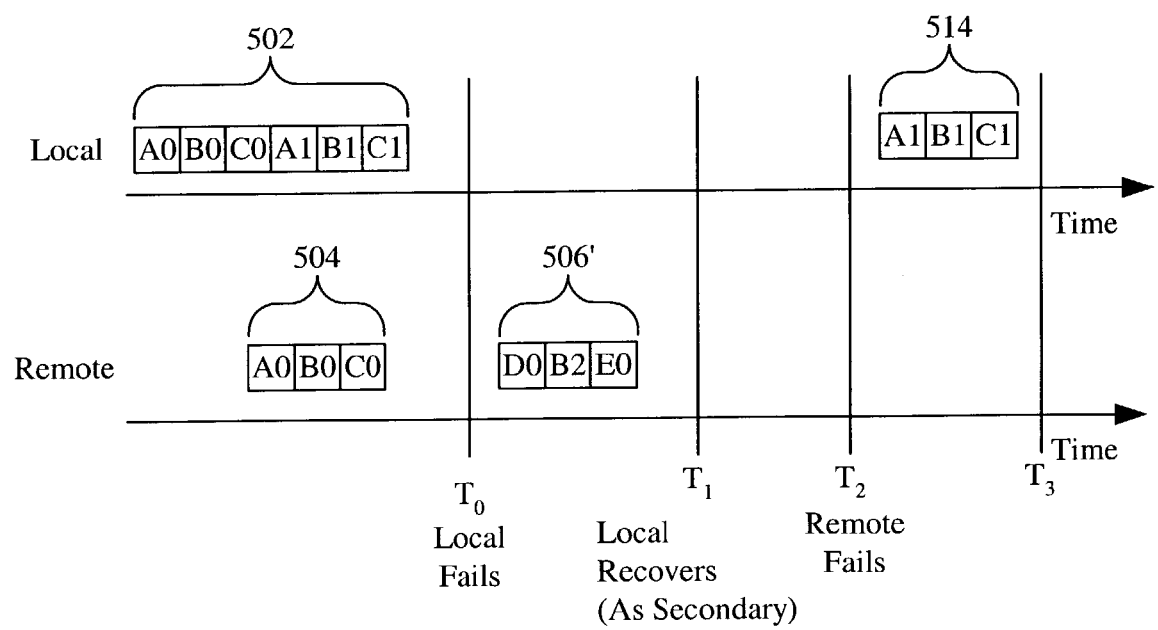
FIG. 10 illustrates a third example of update and back-up copy propagation example during failover and recovery in accordance with an embodiment of the present invention.

FIG. 10 illustrates a third example of update and back-up copy propagation as may occur during failover and recovery in accordance with an aspect of the present invention. As before, FIG. 10 illustrates that updates to the data blocks A, B, C are sent to the remote facility acting as the secondary facility 104. This is shown in FIG. 10 by the sequence 502 including versions A0, B0, C0, A1, B1, C1. Meanwhile, the update sequence 504 including versions A0, B0, C0 is sent to the remote facility acting as the secondary facility 104. Then, assume that at time $T_0$, the local facility experiences a fault. In response, the remote facility assumes the role of primary 102. Thus, after time $T_0$, new updates are only stored at the remote facility. This is shown by the update 506' in which versions D0, B2 and E0 are written between the time $T_0$ and $T_1$.

Then, assume that at time $T_1$, the local facility recovers. However, before the remote facility can forward the updates to the local facility, assume that the remote facility experiences a fault. As shown in FIG. 10, this occurs at time $T_2$. In this case, the local facility will attempt to commit its logged updates instead of receiving an update from the remote facility. Assuming that the version A0, B0 and C0 of the sequence 502 were committed, but versions A1, B1 and C1 were not, versions A1, B1 and C1 may still be in the local log 206 (FIG. 2). Thus, the local facility attempts to commit the versions A1, B1 and C1 of the data blocks A, B and C to the primary copy 208. Accordingly, at time $T_3$, the primary facility may have committed data 514 including versions A1, B1 and C1. In contrast to the circumstances of FIG. 9, the versions D0, B2 and E0 are lost in this case, whereas, the versions A1, B1 and C1 (which were lost in FIG. 9) are recovered.

As before, these operations that result in data consistency may be performed under control of the state machines 400 of FIG. 7 and, thus, may be performed automatically without requiring human intervention. For example, committing the data 514 may occur in the failover state 410 (FIG. 7) as the local facility prepares to resume the role of primary.

Thus, failover techniques for ensuring consistency between the primary and secondary copies of data have been described for a data redundancy system.

As described herein, when a fault occurs at the local facility acting as the primary storage facility 102, the remote facility may assume the role of primary 102 and cease acting as the secondary storage facility 104. However, if a fault then occurs at the remote facility, this may cause the system 100 to be unable to respond to any new write requests from the computer 108. Thus, under some circumstances, it may be desired to provide additional fault tolerance.

In one embodiment, redundant components are provided at the local facility and/or the remote facility to provide additional fault tolerance. For example, a back-up appliance that is redundant of the primary appliance 202 (FIG. 2) may be provided at the local facility. This will tend to prevent a fault at the appliance 202 from forcing the remote facility to take over for the primary. Similarly, an LU that is redundant of the primary LU 208 may be provided at the local facility. This will tend to prevent a fault at the data storage devices which hold the primary LU 208 from forcing the remote facility to assume the role of the primary.

Figure 11:
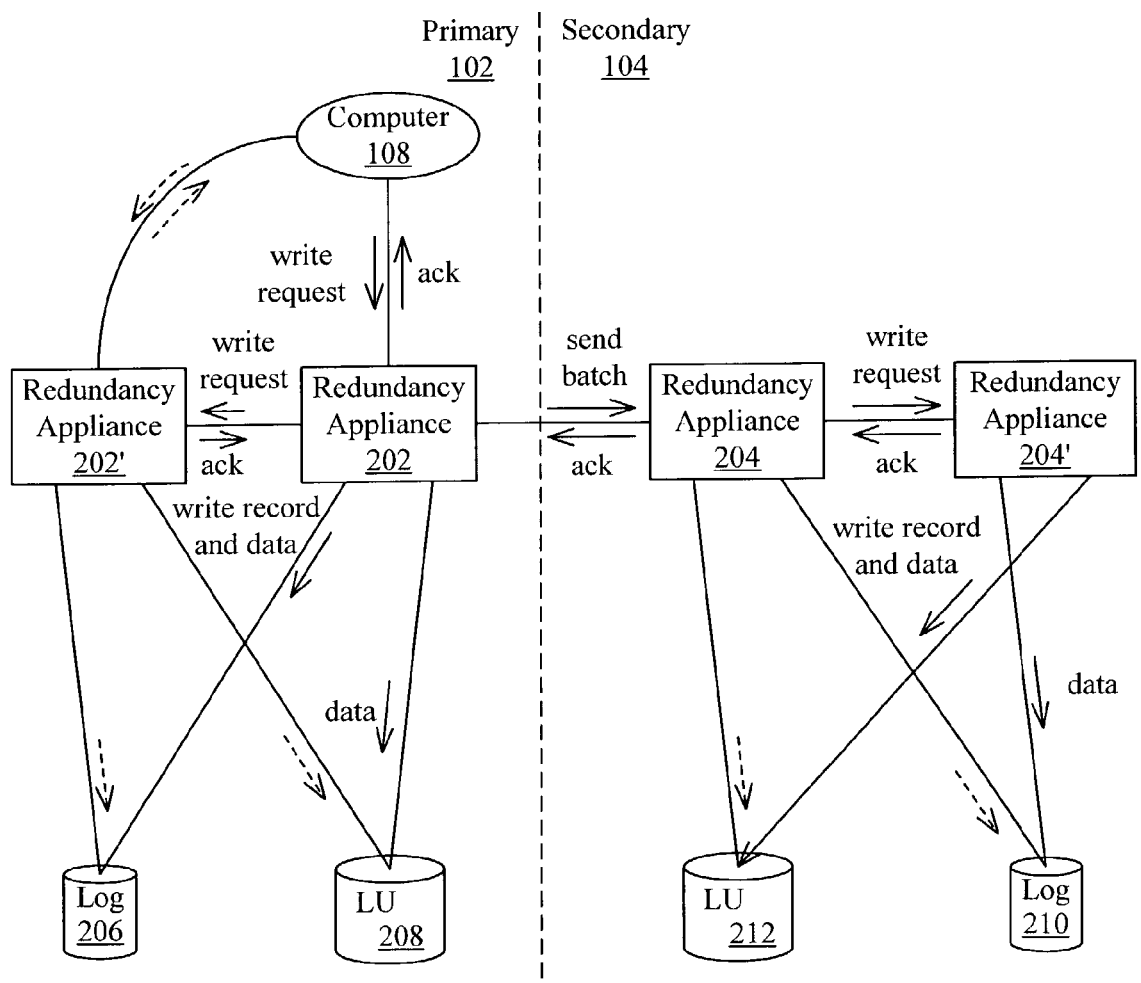
FIG. 11 illustrates primary and secondary storage facilities in which redundant elements are provided in accordance with an embodiment of the present invention.

FIG. 11 illustrates primary and secondary storage facilities in which redundant elements are provided in accordance with an embodiment of the present invention. As shown in FIG. 11, the primary facility 102 includes the appliance 202 for storing data in LU 208. In addition, a redundant appliance 202' is provided at the primary facility 102. Preferably, the redundant appliance 202' is disjoint from its counterpart 202, meaning that it preferably does not share common hardware or software elements, or common failure modes.

In normal operation, in absence of a failure at the appliance 202 or at the redundant appliance 202', the appliance 202 is active and acts as master, while the appliance 202' acts as a shadow or slave. Thus, information about changes made to the active redundancy appliance's LU 208 in response to a write operation requested by the computer 108 are propagated to the shadow appliance 202'. These updates are preferably made synchronously. Accordingly, after the change has been forwarded to the shadow 202' and an acknowledgement received, the write operation may proceed (e.g., by writing to the log 206, to the mass storage 208 and returning an acknowledgement to the host). Write records may be forwarded to the shadow appliance in batches. Further, the acknowledgements may be sent by the shadow appliance in batches.

If the redundant appliance 202' is updated synchronously, it will have the same data and state information as the primary appliance 202 when a fault occurs. Accordingly, the shadowing redundancy appliance 202' may take over operation from the master as soon as it is needed (using the data in LU 208 and the shared log 206).

Though redundant logs may be maintained at each redundancy appliance in primary storage 102, both of the primary redundancy appliances 202 and 202' preferably have access to a common log 206. This is shown in FIG. 11. The common log 206 may be accessible from both appliances 202 and 202', for example, via a storage area network (SAN). Maintaining a single log 206 has an advantage of avoiding any latency associated with making two synchronous updates to a shadow log. Rather, maintaining the shadow appliance's state only incurs extra latency of transferring update messages to the shadowing redundancy appliance (e.g., across an interconnecting LAN between the appliances 202 and 202'). The log 206 can be made fault-tolerant by using a local redundancy scheme, such as RAID5 or mirroring.

Fail-over occurs when the appliance 202 experiences a fault and the redundant appliance 202' then assumes the role of master. When a fault occurs at the appliance 202, this may be detected by the redundant appliance 202'. For example, a fault may be detected by the appliance 202' when the appliance 202 ceases communication with appliance 202' or if the appliance 202 sends a fault notification to the appliance 202'. In response, the redundancy appliance 202' no longer acts as a shadow, but instead responds to read and write requests directly to the computer 108.

Similarly to the primary 102 facility, the secondary facility 104 may also include the appliance 204 for storing data in the LU 212 that is redundant of the data at the primary facility 102. In addition, a redundant appliance 204' may be provided at the secondary facility 104 that is redundant of the appliance 204. Similarly to the primary facility 102, the redundant appliance 204' is preferably disjoint from its counterpart 204.

In normal operation, in absence of a failure at the appliance 204 or at the redundant appliance 204', the appliance 204 is active and acts as master, while the appliance 204' acts as a shadow or slave. Changes made to the active redundancy appliance 204 (e.g., in response to a send batch received from the primary 102), are propagated to the shadow appliance 204'. These changes are preferably made synchronously; accordingly, once the change has been forwarded to the shadow 204', an acknowledgement may be returned to the primary 102. Because the redundant appliance 204' is preferably updated synchronously, it will have the same data and state information as the primary appliance 204 when a fault occurs and may take over operation from the master as soon as it is needed (using the shared log 210).

Assuming all of the appliances 202, 202', 204 and 204' are present and operational, a write request (e.g., issued by the computer 108) may be received at the appliance 202. In response, the appliance 202 causes a write record to be written synchronously in the primary log 206. In addition, the corresponding data for the request is written to the primary copy of the data at LU 208. The appliance 202 forwards the write record to the shadow appliance 202'. In response, the shadow appliance 202' updates any local data it maintains, and sends an acknowledgement to the appliance 202. An acknowledgement may then be sent to the computer 108 indicating the request was successfully stored by the primary facility 102.

Independently, the primary LU 208 and the secondary LU 212 may each be independently locally replicated, and made to have one or more local, redundant, shadow copies. This additional redundancy is in addition to any internal redundancy provided by the storage devices on which the LUs are stored. In particular, the redundant shadow LU copies preferentially reside on different storage devices, so that the redundant copy is stored disjointly from its counterpart, meaning that they preferably do not share common hardware or software elements or common failure modes. Updates to the main copy LU 208 or LU 212 are preferably propagated to their shadow copy in the same order that they are written to the main copy; this may be achieved synchronously or asynchronously.

As described above in reference to FIGS. 3–5, the primary facility 102 may batch the write requests into a send batch prior to forwarding them to the secondary facility 104. The appliance 204 at the secondary 104 then causes the batch to be written in the secondary log 210. In addition, the corresponding data for the batch is written to the primary copy of the data at LU 212, though committing the data to the LU 212 may be performed according to receive batches formed by the appliance 204 where the receive batches honor any receive barriers. The appliance 204 forwards the data to the shadow appliance 204'. This is preferably done by forwarding receive batches to the shadow appliance 204'. In response, the shadow appliance 204' records the writes of the data for the batch in LU 212 and sends an acknowledgement to the appliance 204. An acknowledgement may then be sent to the primary facility 102 indicating the request was successfully stored by the secondary facility 102.

While the primary 102 and secondary 104 are described as each having a redundant appliance and LU, this is not necessary. For example, the redundant appliance 202' and LU 208' may be provided at the local facility, but not at the remote facility. Thus, while the local facility acts as the primary, it will generally be able to withstand more faults than otherwise before the remote facility needs to assume the role of primary.

As described, redundancy at the local and/or remote facilities is implemented by one of the appliances being active (i.e. acting as the master) and the other acting as the shadow (or slave). In an alternate embodiment, both appliances may be active. In this case, each appliance 202 and 202' at the primary 102 may communicate directly with the computer 108 to perform operations (e.g., writes) in parallel. Similarly, each appliance 204 and 204' at the secondary 104 may communicate directly with the primary 102.

Thus, a data redundancy technique has been described in which redundant components are provided at primary and/or secondary facilities for improved fault tolerance.

Figure 12:
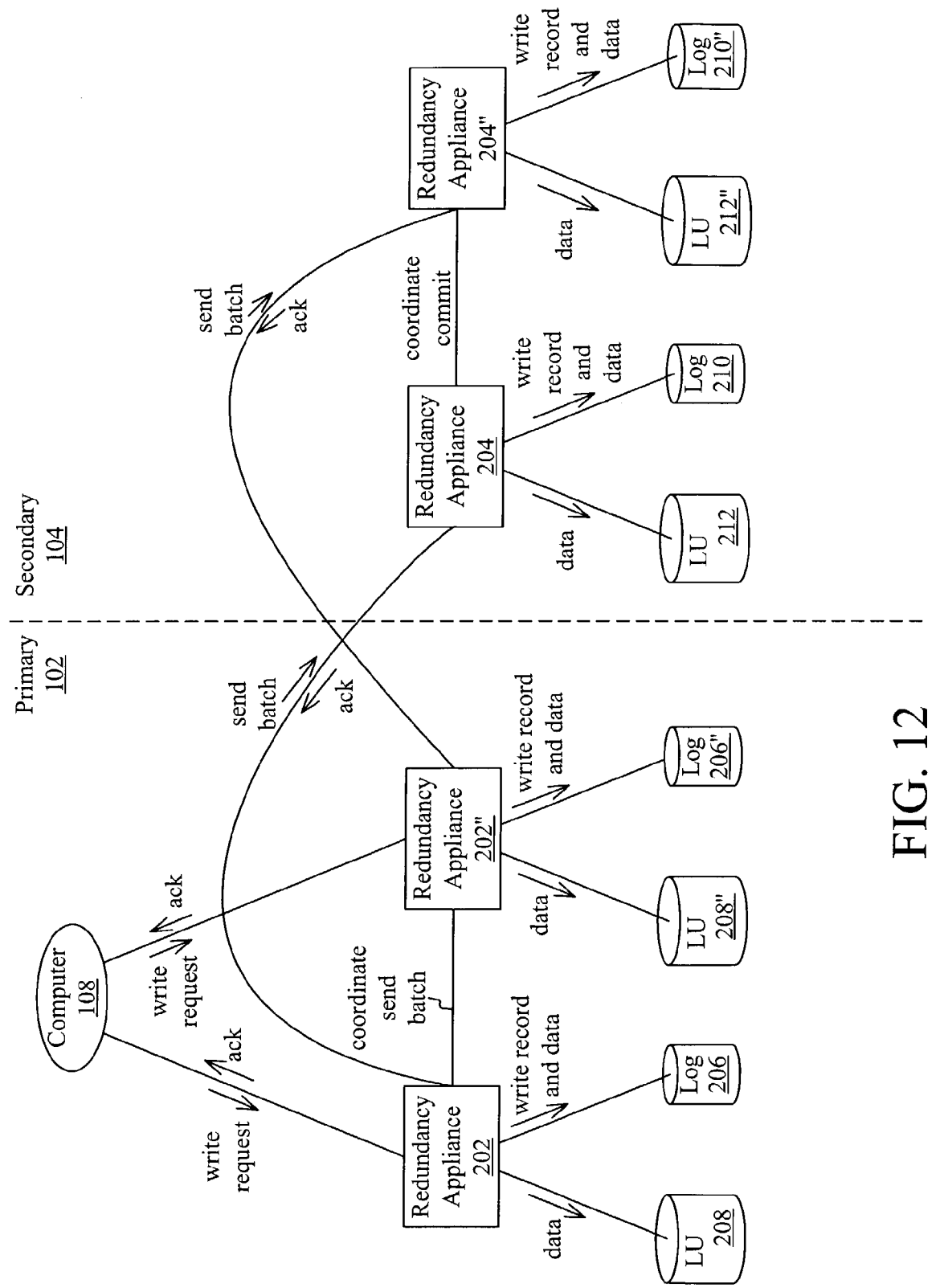
FIG. 12 illustrates primary and secondary storage facilities in which data storage is distributed in accordance with an embodiment of the present invention.

In one embodiment, multiple components are provided at the local facility and/or the remote facility for performing data storage operations in a distributed manner. Because the operations are distributed in such a facility, it is expected that the facility will be able to accommodate a larger workload than otherwise (e.g., having a higher storage request rate or requiring additional storage capacity). For example, a pair of appliances may be provided at the local facility, each having a corresponding log and LU. FIG. 12 illustrates primary and secondary storage facilities in which data storage is distributed in accordance with an embodiment of the present invention. Thus, the appliance 202 uses the log 206 and the LU 208, while an additional appliance 202" uses an additional log 206" and LU 208". In this case, the logs and LUs store different data, such that the request workload to be serviced by the primary facility 102 is distributed among the appliances 202 and 202" and their associated logs and LUs. Thus, some requests received by the primary facility 102 (e.g., from the computer 108) are serviced by the appliance 202, while others are serviced by the appliance 202". The requests may be assigned to the appliance 202 or the appliance 202" by the application that generates the requests (e.g., applications running on the computer 108) or by any other technique for assigning data to storage units. For example, it may be desired to balance the loads between the two appliances 202 and 202" such as by assigning applications or data blocks to each such that each has an approximately equal workload.

So that the secondary facility 104 is able to accommodate the same workload as the primary facility 102, the secondary facility 104 is preferably also provided with additional components corresponding to those of the primary facility 102. As shown in FIG. 12, the secondary facility 104 includes the appliance 204 that uses log 210 and LU 212 and an additional appliance 204" that uses log 210" and LU 212".

In operation, when a write request is received at the appliance 202, a write record is written (preferably, synchronously) to the log 206 at the primary facility 102. In addition, the corresponding data for the request is written to a primary copy of the data in LU 208. An acknowledgement may then be sent to the computer 108 indicating the request was successfully stored by the primary facility 102. Similarly, when a write request is received at the appliance 202", a write record is written to the log 206" and the corresponding data is written to a primary copy of the data in LU 208". Once the data is successfully stored, an acknowledgement may then be sent to the computer 108.

Because the primary LUs 208 and 208" each store portions of the primary copy of the data at the primary facility 102, updates to the redundant version of the data at the secondary facility 104 are preferably coordinated among the appliances at the primary 102 so as to maintain data consistency. For example, in absence of such coordination, in the event of a failure at one of the appliances 204 or 204", the other appliance may continue to function. Over time, the data in the LUs 212 and 212" may become inconsistent with the other since only portions of the data in the functioning LU would continue to receive updates. This could result in inconsistency at the secondary facility 104, which could prevent application recovery in case of failure of the primary 102. Thus, in a preferred embodiment, updates are coordinated among the appliances at the primary 102 before the updates are forwarded to the secondary facility 104.

Coordinating updates among the appliances 202 and 202" at the primary 102 is preferably accomplished by coordinating send batch boundaries. In one aspect, one of the appliances 202 or 202" may first determine a time at which to terminate the current send batch according to any of the criteria described herein (e.g., by batch size or available communication bandwidth between the primary 102 and secondary 104). The appliance at the primary 102 which determined the boundary may then declare a send batch boundary to the other appliance at the primary 102 by informing the other of the time at which its current batch should be terminated. In this way, each appliance 202 and 202" terminates its current batch at approximately the same point in time.

In another aspect, the batches may be terminated by the computer 108 declaring the end of a send batch. For example, an application at the computer 108 may issue a write operation that includes a predetermined end-of-batch indicator that is recognizable to the appliances 202 and 202". The computer 108 may, thus, signal both appliances 202 and 202" to end their current batches. In this manner, the computer 108 may also specify in advance a time for the batches to end. As another example, the computer 108 may notify one of the appliances 202 or 202" to end the current batch. The appliance at the primary 102 that receives the notification may then notify the other appliance at the primary 102 to end its current batch. In this case, the computer 108 or the appliance that receives the notification from the computer 108 may select a time at which the batches should be ended. Thus, terminating the send batches is a two-phase operation. In a first phase the end of batch is declared. In the second phase, each appliance 202 and 202" ends its current batch in accordance with the declaration.

Once the batches are terminated, each appliance 202 and 202" may then send its batch to a corresponding one of the appliances at the secondary facility 104. More particularly, data stored in LU 208 by appliance 202 at the primary 102 is forwarded to the appliance 204 for storage in the LU 212 at the secondary 104. In addition, data stored in the LU 208" by appliance 202" at the primary 102 is forwarded to the appliance 204" for storage in the LU 212" at the secondary 104.

The appliances 204 and 204" at the secondary 104 then cause their respective batches to be written in the secondary logs 210 and 210" respectively. In addition, the corresponding data for the batches is written to the primary copy of the data at LU 212 and 212", respectively. Committing the data to the LU 212 may be performed according to receive batches formed by the appliances 204 and 204" where the receive batches honor any receive barriers.

In addition, to maintain data consistency at the LUs of the secondary facility 204, the appliances 204 and 204" preferably coordinate committing of the batches to their respective LUs 212 and 212". Committing the batches at the secondary may also be performed as a two-phase operation. For example, one of the appliances 204 or 204" may first determine a time at which to commit the current batch according to any of the criteria described herein (e.g., after a data check). The appliance at the secondary 104 which determined the time to commit the batch may then declare this to the other appliance at the secondary 104 by informing the other of the time at which its batch should be committed. In this way, each appliance 204 and 204" commits its batches to storage at approximately the same point in time. Well-known techniques such as "two-phase commit" can be used to ensure that both commit, or neither does. An acknowledgement may then be sent to the primary facility 102 indicating that the data was successfully stored by the secondary facility 104. The appliances 202 and 202" at the primary 102 may then delete the corresponding records in their logs 206 and 206". Deleting of the logs at the primary 102 can be performed independently (i.e. the appliances 202 and 202" need not coordinate deletion with each other).

Thus, a data redundancy technique has been described where functions at a primary and/or secondary facility are distributed for increased performance.

In embodiments described herein, the redundancy appliances 202 and 204 are each generally positioned in the path of write transactions to the LU associated with the appliance. For example, referring to FIG. 2, the appliance 202 at the primary facility 102 stores write transactions locally in the primary LU 208. In addition, the appliance 202 forwards the write transactions (e.g., in send batches) to the secondary facility 104. Thus, in some circumstances, the appliance 202 may become a bottleneck. To reduce this possibility, the functions of storing the write transactions locally and forwarding them to the secondary facility may be performed separately. For example, the primary appliance 202 may perform functions related to forwarding write transactions to the secondary facility 104, while the computer 108 (or other software and/or hardware at the primary facility 102) may perform operations related to local storage of data for write transactions.

While not necessary, this separation of functionality may be employed at both the local facility and at the remote facility. In this case, the local and remote facilities may each separate their functions of storing locally-originated write transactions locally and forwarding redundant data to another facility. Thus, when the remote facility assumes the role of primary (e.g., in the event of a fault at the primary or for transactions for which the remote facility in the primary), the remote facility may separate these functions in the same way as the local facility. Also, the remote facility may function as a primary storage facility for some data storage operations and as a secondary data storage facility for other data storage operations.

Figure 13:
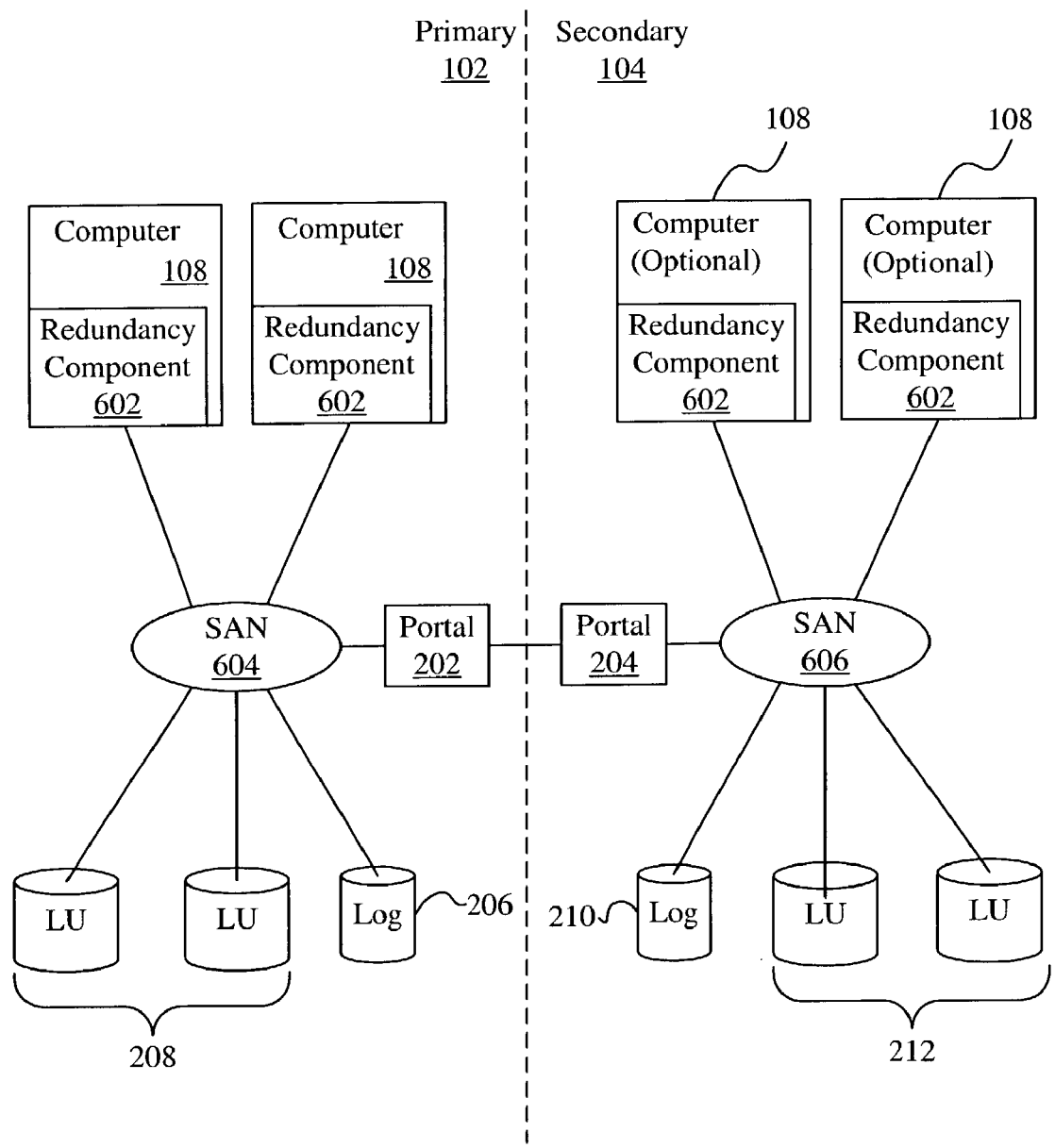
FIG. 13 illustrates primary and secondary storage facilities including network portal redundancy appliances in accordance with an embodiment of the present invention.

FIG. 13 illustrates primary 102 and secondary storage facilities 104 in accordance with an embodiment of the present invention. As shown in FIG. 13, the computer 108 (and possibly one or more additional computers 108) may store data in the log 206 and one or more LUs 208 without intervention by the appliance 202. Rather, the computer 108 (e.g. a host computer) includes a redundancy component 602 and a communication medium 604 for providing a communication path between the redundancy component and the primary log 206 and LU 208. As is also shown in FIG. 13, the medium 604 allows communications between the computer 108 and the storage elements 206 and 208 to bypass the appliance 202. However, the appliance 202 is preferably coupled to the communication medium 604 for forwarding transactions to the secondary facility 104. The redundancy component 602 may be implemented as computer-based software, such as an I/O adapter or device driver and may include additional hardware at the computer 108. The communication medium 604 may be implemented as any kind of network, such as a storage area network (SAN) or a local area network (LAN).

Similarly to the primary facility 102, the secondary facility 104 may include communication medium 606 coupled to the secondary log 210 and LU 212. When the secondary 104 acts as a primary storage facility, the communication medium 606 allows communications between one more computer systems 108 to bypass the redundancy appliance 204 at the secondary 104. The appliance 204 is preferably also coupled to the medium 606 for storing data received from the primary 102 in storage elements 210 and 212. The appliances 202 and 204 may communicate with each other by a network, for example, via a wide area network (WAN). The appliances 202 and 204 may be referred to as network portal redundancy appliances (or simply "portals" or "appliances") since they serve to connect the primary network 604 to the secondary network 606. It will be apparent that the redundancy portals 202 and 204 may be each be implemented as a dedicated device, or by a host computer (e.g. host 108) or by a storage device (e.g., a device that includes the LU 208).

In response to a write request issued by a computer 108, the redundancy component 602 writes a record of the request to the log 206 including a copy of the data to be written. The redundancy component 602 also writes the data to the LU 208 and sends a reply to the application (e.g., at the computer 108) that issued the request. The portal 202 retrieves write records from the primary log 206 and forwards them to the secondary facility 104, while preserving the write-ordering of the requests.

So that the portal 202 is informed of the write-ordering of the requests in the log 206, each write record may have an associated timestamp. The portal 202 may then forward the write records to the secondary facility 104 in order of ascending timestamp values. In one embodiment, before storing a write record in the log 206, the redundancy component 602 obtains a timestamp for the request and stores the timestamp in the log 206 as part of the record for the request.

In addition, so that the portal 202 is informed of the location of write requests in the log 206, the redundancy component 602 may notify the portal of the location of each write request after one or more write requests have been stored in the log 206. Retrieval and forwarding of the request may commence immediately after the data is stored in the LU 208. Thus, the redundancy component 602 may also notify the portal 202 to retrieve the request as soon as it has been stored in the LU 208. In this case, the portal 202 may retrieve the request concurrently with the redundancy component 602 sending the reply to the requesting application.

The portal 202 may forward write requests according to send batches. In this case, the redundancy component 602 may overwrite records in the log 206 where a later received request overwrites an earlier request in the log 206. In this case, the redundancy component 602 informs the portal of the send batch boundaries so that the portal 202 may retrieve an entire send batch for forwarding to the secondary facility 104. In this case, the redundancy component 602 also preferably informs the portal of the location of receive barriers (see FIG. 5 herein) so that receive batches may be committed at the secondary 104 as a unit. Where send batches are employed, the redundancy component 602 need only inform the portal 202 of parameters for batches, such as a timestamp and location of the batch, rather than informing the portal 202 of the timestamp and location for every write transaction in the log 206.

When the portal 204 at the secondary facility 104 receives a write record (or a batch of write records), the secondary portal 204 writes the record (or batch) into the secondary log 210 and may then send an acknowledgement to the primary portal 202. In response, the primary facility 102 may delete the corresponding records in the log 206. Preferably, the primary portal 202 deletes the records, though this may also be accomplished by the redundancy component 602.

The secondary facility 104 commits data (e.g., in receive batches) to the secondary LU 212 in the order received from the primary facility 102 and then deletes the corresponding records from the secondary log 210. Storing the data in the LU 212 and deleting the records from the log 210 are preferably performed by the portal 204 though a redundancy component 602 at the secondary 104 may perform some of these functions.

Thus, a data redundancy technique using host and portal components has been described.

It may be desired to provide a technique for testing operation of a data redundancy system. For example, in view of the number of states of the state machine 400 and the numerous possible event sequences, it would be desirable to verify operation of a data redundancy system using one or more the state machines 400. As explained above in reference, transitions among the states of the state machine 400 of FIG. 7 and operation within the states occur in response to external events, such as write requests and faults (e.g., a log disk fault or a network fault) and in response to internal events, such as log space exhaustion, update propagation and batch commits. In one aspect, the system 100 employing one or more state machines 400 is tested by applying a sequence of events and evaluating behavior of the system 100 in response. This testing may be performed, for example, on a physical implementation of the system 100 or on a simulation of the system 100 (where the simulator uses software and/or hardware to simulate operation of the system 100).

Figure 14:
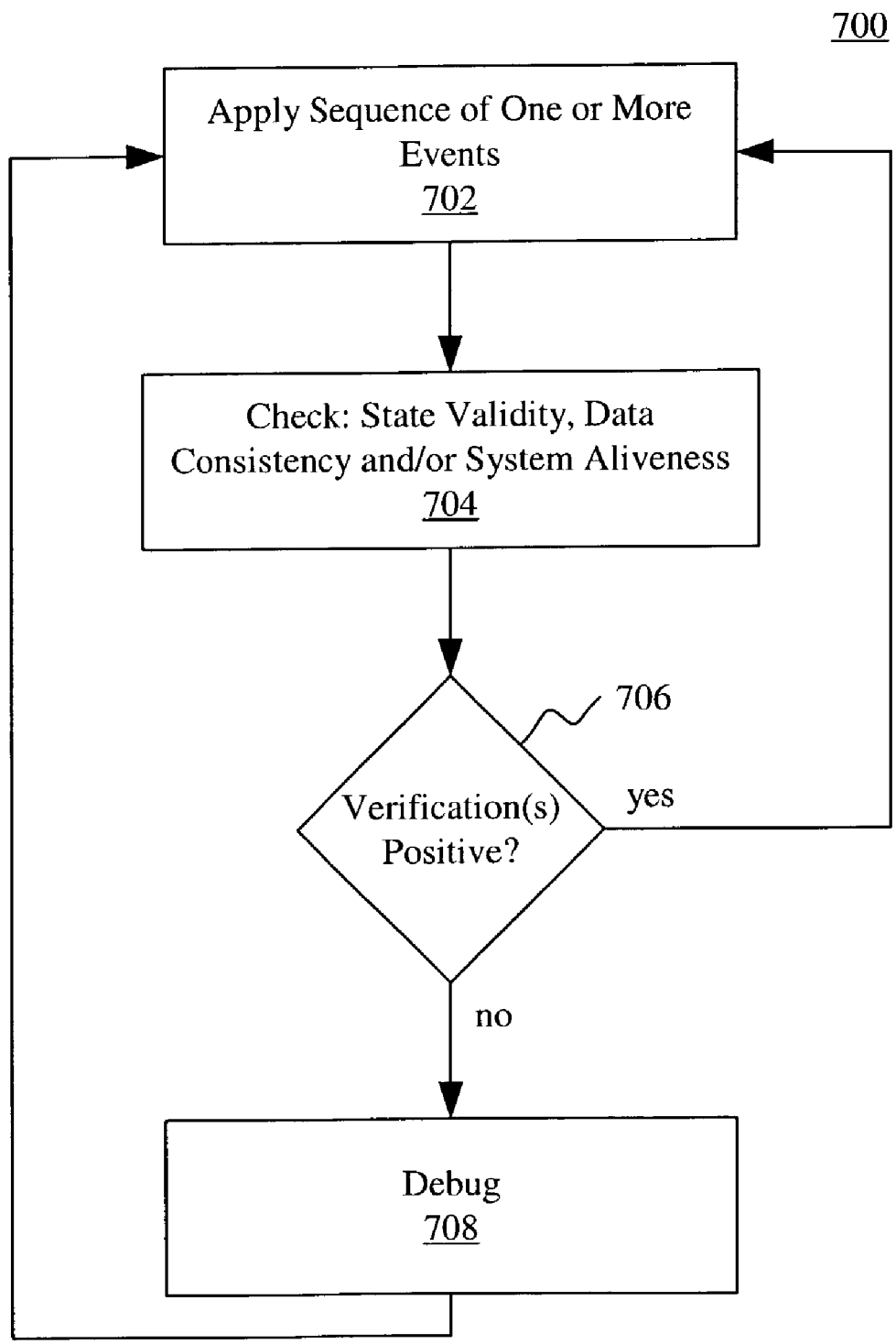
FIG. 14 illustrates a flow diagram of a method for testing a data redundancy system in accordance with an embodiment of the present invention.

FIG. 14 illustrates a flow diagram of a method 700 for testing a data redundancy system 100 or its simulation (the two will be treated as equivalent in what follows) in accordance with an embodiment of the present invention. In a step 702, a sequence of one or more events is applied to the data redundancy system 100. The events may include, for example, write operations, failover or fallback events, including failures of various elements of the system 100, such as a log disk being non-responsive or a network communication interruption, and various recovery events, such as a failed log disk becoming responsive again or a network becoming operational again after a communication interruption.

In a step 704, one or more verifications are then performed on the system 100. In a preferred embodiment, the verifications include one or more of the following: a state validity verification, a data consistency verification and a system liveness verification.

The state validity verification determines whether, after receiving the event(s) of step 702, the current state of the system 100 is valid with respect to the state machines 400. For example, the current state of the primary facility 102 and the secondary facility 104 may be checked to determine whether each is in a valid one of the states of its respective state machine 400. This may also include determining whether the two states are consistent with each other. For example, when the local facility is in the standalone state 414, the remote facility should generally be in the failed state 406.

The data consistency verification determines whether the primary and secondary copies of the data 208 and 212 are consistent (e.g., in the normal states 402 and 404) and that the sequence of updates at the secondary facility 104 is a prefix of the sequence at the primary 102 (i.e., the updates at the secondary 104 include updates from the primary 102 in their proper order, although the secondary 104 may be missing updates that have not yet been propagated from the primary 102).

The liveness verification determines, in absence of a failure, whether data for all write requests received at the primary 102 are eventually written to both the primary 102 and the secondary 104. To check liveness, external events (e.g., write requests and failures) are ceased and the system 100 is allowed to continue operation until all events have been processed. Then, the system 100 is checked to ensure that all of the write requests generated (in step 702) have been processed at both the primary 102 and the secondary 104.

Once the verifications in step 704 have been performed, a determination is made in step 706 as to whether all the verifications were positive. If not, this indicates that an operational error was encountered. Accordingly, the system 100 may be evaluated (i.e. debugged by a human operator) in step 708 to identify and correct the cause of the error. Once this has been completed, a sequence of one or more events may again be applied in step 702 and the verification(s) performed again in step 704. If all the verifications are satisfied in step 706, this indicates that system 100 operated correctly in response to the events applied in step 702. Thus, one or more new events may be applied to the system 100 in step 702 and the process of performing the verifications may be repeated.

Accordingly, testing of the system 100 is performed incrementally, in which the system 100 (or a simulation thereof) is injected with a sequence of external events until a verification fails. When a verification fails, the system 100 is debugged and the error corrected. This process may be repeated until a sufficient number of events and event sequences have been applied to ensure that the system 100 operates as intended.

Thus, a technique for verifying operation of a data redundancy system has been described.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A data redundancy system including a primary facility for storing a primary copy of data and a secondary facility for storing data that is redundant of the primary copy of the data, wherein the primary facility comprises:
   a first redundancy appliance for receiving a first sequence of write requests and for storing data for the first sequence of write requests in mass storage associated with the first redundancy appliance; and
   a second redundancy appliance for receiving a second sequence of write requests and for storing data for the second sequence of write requests in mass storage associated with the second redundancy appliance;
   wherein the first redundancy appliance and the second redundancy appliance each forward redundant data to the secondary facility in send batches having coordinated send batch boundaries.

2. The data redundancy system according to claim 1, wherein a first write transaction in a send batch at the primary facility is replaced with a second write transaction where the second write transaction overwrites data written by the first write transaction.

3. The data redundancy system according to claim 1, wherein the send batch boundaries are coordinated by one of the first and second redundancy appliances informing the other of how a send batch is to be terminated.

4. The data redundancy system according to claim 1, wherein the send batches are terminated based on time.

5. The data redundancy system according to claim 1, wherein the send batches are terminated immediately.

6. The data redundancy system according to claim 1, wherein the send batches are terminated at a previously identified time.

7. The data redundancy system according to claim 1, wherein the send batches are terminated after a previously identified request is received.

8. The data redundancy system according to claim 1, wherein the send batches are terminated upon agreement of the first and second redundancy appliances.

9. The data redundancy system according to claim 1, wherein the send batches are terminated upon notification from a host.

10. The data redundancy system according to claim 1, wherein the send batches are terminated after a determined quantity of data is received.

11. The data redundancy system according to claim 1, wherein the send batches are terminated based on log space utilization.

12. The data redundancy system according to claim 1, further comprising a host computer coupled to the first and second redundancy appliances wherein the send batch boundaries are coordinated by the host computer informing both of the first and second redundancy appliances of how a send batch is to be terminated.

13. The data redundancy system according to claim 1, further comprising a host computer coupled to the first and second redundancy appliances wherein the send batch boundaries are coordinated by the host computer informing one of the first and second redundancy appliances of how a send batch is to be terminated and wherein the one redundancy appliance informs the other of the time.

14. The data redundancy system according to claim 1, wherein the secondary facility comprises a third redundancy appliance for storing redundant data for the first sequence of write requests in mass storage associated with the third redundancy appliance.

15. The data redundancy system according to claim 14, further comprising a fourth redundancy appliance for storing redundant data for the first sequence of write requests in mass storage associated with the fourth redundancy appliance.

16. The data redundancy system according to claim 15, wherein the third redundancy appliance and the fourth redundancy appliance each store redundant data to the secondary facility according to receive batches.

17. The data redundancy system according to claim 16, wherein the receive batches have coordinated receive batch boundaries.

18. The data redundancy system according to claim 16, wherein the receive batches are stored by the third and fourth redundancy appliances performing a two-phase commit operation at the secondary facility.

19. The data redundancy system according to claim 16, wherein an acknowledgement is sent to the primary facility after a receive batch has been stored at the secondary facility.

20. The data redundancy system according to claim 16, wherein the first redundancy appliance and the second redundancy appliance each forward redundant data to the secondary facility in send batches having coordinated send batch boundaries.

21. The data redundancy system according to claim 16, wherein the third redundancy appliance and the fourth redundancy appliance each store redundant data to the secondary facility after a batch is determined safe to apply.

22. The data redundancy system according to claim 21, wherein a batch is determined safe to apply when a data integrity test is successfully performed.

23. The data redundancy system according to claim 14, wherein an acknowledgement is sent to the primary facility after a receive batch has been stored at the secondary facility.

24. The data redundancy system according to claim 14, wherein the first redundancy appliance and the second redundancy appliance each forward redundant data to the secondary facility in send batches having coordinated send batch boundaries.

25. The data redundancy system according to claim 14, wherein the third redundancy appliance and the fourth redundancy appliance each store redundant data to the secondary facility after a batch is determined safe to apply.

26. The data redundancy system according to claim 25, wherein a batch is determined safe to apply when a data integrity test is successfully performed.

27. The data redundancy system according to claim 1, wherein the first redundancy appliance is disjoint from the second redundancy appliance.

28. A data redundancy method for storing a primary copy of data at a primary storage facility and for storing data that is redundant of the primary copy at a secondary storage facility, the method comprising:

receiving a first sequence of write requests at the primary storage facility and receiving a second sequence of write requests at the primary storage facility;

arranging the first sequence write requests according to a first sequence of send batches and arranging the second sequence of write requests according to a second sequence of send batches wherein boundaries of batches in the first sequence of send batches are coordinated to boundaries of batches in the second sequence of send batches, the send batch boundaries coordinated according to a time at which a send batch is to be terminated, the coordination performed by a host computer informing one of the first and second redundancy appliances of how a send batch is to be terminated and wherein the one redundancy appliance informs the other, wherein said first sequence of write requests is received by a first redundancy appliance at the primary storage facility and said second sequence of write requests is received by a second redundancy appliance at the primary storage facility; and forwarding the batches in the first and second sequence of batches to the secondary storage facility;

receiving the first sequence of send batches at the secondary storage facility and receiving the second sequence of send batches at the secondary storage facility; and arranging the first sequence of send batches according to a first sequence of receive batches and arranging the second sequence of send batches according to a second sequence of receive batches;

wherein said first sequence of send batches are arranged into the first sequence of receive batches by a third redundancy appliance at the secondary storage facility and said second sequence of send batches are arranged into the second sequence of receive batches by a fourth redundancy appliance at the secondary storage facility.

29. The data redundancy method according to claim 28, further comprising storing the redundant data at the secondary facility according to the receive batches by the third and fourth redundancy appliances performing two-phase commit operations at the secondary facility.

30. A data redundancy method for storing a primary copy of data at a primary storage facility and for storing data that is redundant of the primary copy at a secondary storage facility, the method comprising:

receiving a first sequence of write requests at the primary storage facility and receiving a second sequence of write requests at the primary storage facility;

arranging the first sequence write requests according to a first sequence of send batches and arranging the second sequence of write requests according to a second sequence of send batches wherein boundaries of batches in the first sequence of send batches are coordinated to boundaries of batches in the second sequence of send batches; and forwarding the batches in the first and second sequence of batches to the secondary storage facility;

wherein the send batches are terminated based on log space utilization.

* * * * *